United States Patent
McDonough et al.

[11] Patent Number: 6,163,749
[45] Date of Patent: Dec. 19, 2000

[54] METHOD AND SYSTEM FOR SCROLLING A MAP DISPLAY IN A NAVIGATION APPLICATION

[75] Inventors: William McDonough, Glen Ellyn; Srinivasa Rao, Mount Prospect; Ashutosh Srivastava, Elk Grove Village, all of Ill.

[73] Assignee: Navigation Technologies Corp., Rosement, Ill.

[21] Appl. No.: 09/092,625

[22] Filed: Jun. 5, 1998

[51] Int. Cl.[7] .............................. G08G 1/123; G09G 5/32
[52] U.S. Cl. .......................... 701/208; 701/212; 340/995
[58] Field of Search .................................. 701/201, 208, 701/209, 210, 211, 212; 340/990, 995; 345/119, 123

[56] References Cited

U.S. PATENT DOCUMENTS

| | | | |
|---|---|---|---|
| 4,511,973 | 4/1985 | Miura et al. | 701/208 |
| 4,527,155 | 7/1985 | Yamaki et al. | 345/126 |
| 4,550,317 | 10/1985 | Moriyama et al. | 340/995 |
| 4,571,684 | 2/1986 | Takanabe et al. | 701/200 |
| 4,638,438 | 1/1987 | Endo et al. | 701/212 |
| 4,646,089 | 2/1987 | Takanabe et al. | 340/995 |
| 4,675,676 | 6/1987 | Takanabe et al. | 340/995 |
| 4,737,916 | 4/1988 | Ogawa et al. | 701/200 |
| 4,744,033 | 5/1988 | Ogawa et al. | 701/200 |
| 4,757,455 | 7/1988 | Tsunoda et al. | 701/208 |
| 4,760,531 | 7/1988 | Yasui et al. | 701/200 |
| 4,780,717 | 10/1988 | Takanabe et al. | 340/995 |
| 4,796,191 | 1/1989 | Honey et al. | 701/217 |
| 4,807,157 | 2/1989 | Fukushima et al. | 345/431 |
| 4,812,980 | 3/1989 | Yamada et al. | 701/200 |
| 4,825,381 | 4/1989 | Bottorf et al. | 701/200 |
| 4,845,631 | 7/1989 | Bottorf | 345/515 |
| 4,876,651 | 10/1989 | Dawson et al. | 701/200 |
| 4,914,605 | 4/1990 | Loughmiller et al. | 345/432 |
| 4,937,570 | 6/1990 | Matsukawa et al. | 340/905 |
| 4,996,645 | 2/1991 | Schneyderberg Van Der Zon | 701/200 |
| 5,089,826 | 2/1992 | Yano et al. | 342/457 |
| 5,115,398 | 5/1992 | De Jong | 701/200 |
| 5,161,886 | 11/1992 | De Jong et al. | 701/209 |
| 5,274,387 | 12/1993 | Kakihara et al. | 342/451 |
| 5,297,051 | 3/1994 | Arakawa et al. | 701/200 |
| 5,323,321 | 6/1994 | Smith, Jr. | 701/211 |
| 5,359,529 | 10/1994 | Snider | 701/210 |
| 5,371,497 | 12/1994 | Nimura et al. | 340/995 |
| 5,381,338 | 1/1995 | Wysocki et al. | 701/207 |

(List continued on next page.)

FOREIGN PATENT DOCUMENTS 2 102 259   1/1983   United Kingdom .

OTHER PUBLICATIONS

J. Ahn and H. Freeman, *A Program for Automatic Name Placement*; published in vol. II of the Proceedings of the Sixth International Symposium on Automated Cartography, ed. Barry S. Wellar, 1983.

Ahn, John Kwangho, *Automatic Map Name Placement System*, Rensselaer Polytechnic Institute, Ph.D. Thesis, May 1984; pp. 1–84.

Stephen A. Hirsch and Barry J. Glick,.*Design Issues for an Intelligent Names Processing System*, published prior to Mar. 24, 1998.

Mark S. Monmonier, *Computer Assisted Cartography Principles and Prospects*; 1982; pp. 158–185.

*Primary Examiner*—Tan Nguyen
*Attorney, Agent, or Firm*—Frank J. Kozak; Lawrence M. Kaplan

[57] ABSTRACT

A system and method for implementing a smooth scrolling function in a map display tool used with a navigation system and a map database. The system includes a map processing layer in the map display tool having a multi-tasking abstraction layer and a synchronization object for allowing portability between different platforms. The method includes the steps of updating a display from a first graphics buffer while executing a look-ahead process in the background and filling a second graphics buffer with map information on a predicted future position.

21 Claims, 11 Drawing Sheets

U.S. PATENT DOCUMENTS

| | | | |
|---|---|---|---|
| 5,383,128 | 1/1995 | Nishida et al. | 701/210 |
| 5,396,430 | 3/1995 | Arakawa et al. | 701/200 |
| 5,406,493 | 4/1995 | Goto et al. | 364/449 |
| 5,414,629 | 5/1995 | Inoue | 701/201 |
| 5,448,696 | 9/1995 | Shimada et al. | 345/357 |
| 5,559,938 | 9/1996 | Van Roekel et al. | 345/441 |
| 5,573,402 | 11/1996 | Gray | 434/69 |
| 5,613,055 | 3/1997 | Shimoura et al. | 345/473 |
| 5,629,854 | 5/1997 | Schulte | 701/207 |
| 5,754,161 | 5/1998 | Noguchi et al. | 345/123 |
| 5,808,598 | 9/1998 | Nakatani et al. | 345/123 |
| 6,016,110 | 1/2000 | Takinami | 340/995 |

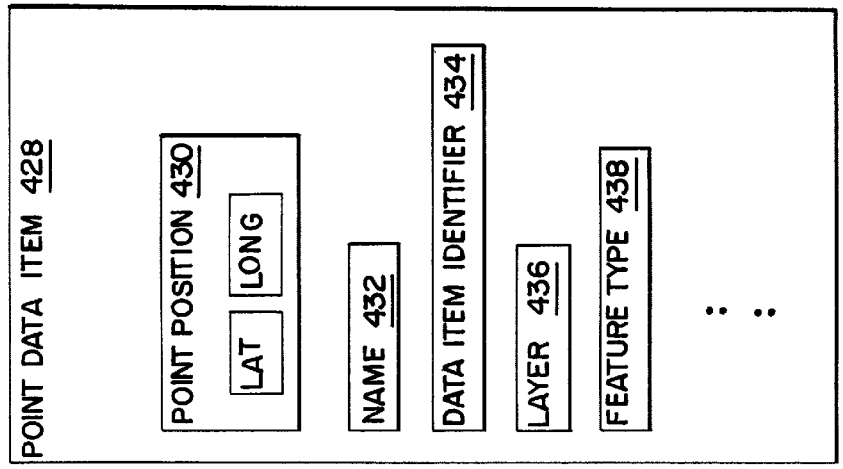
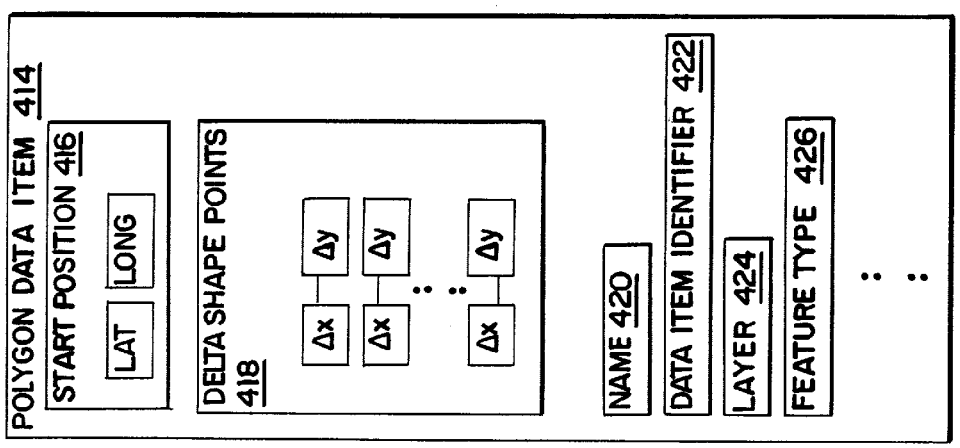
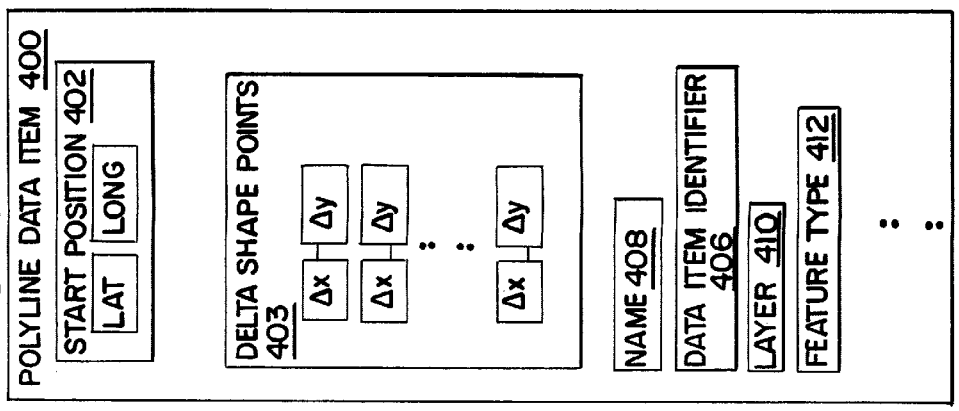

METHOD AND SYSTEM FOR SCROLLING A MAP DISPLAY IN A NAVIGATION APPLICATION

BACKGROUND OF THE INVENTION

The present invention relates to a system and method for scrolling a map display in a navigation application program.

Computer-based navigation systems are able to provide end-users, such as vehicle drivers as well as others, with various navigating functions and features. For example, some navigation systems are able to determine an optimum route to travel by roads between locations in a geographic region. Using input from the end-user, and optionally from equipment that can determine the end-user's physical location (such as a GPS system), a navigation system can examine various routes between two locations to determine an optimum route to travel from a starting location to a destination location in the geographic region. The navigation system may then provide the end-user with information about the optimum route in the form of instructions that identify the maneuvers required to be taken by the end-user to travel from the starting location to the destination location. The navigation system may be located in an automobile and the instructions may take the form of audio instructions that are provided as the end-user is driving the route. Some navigation system are able to show detailed maps on computer displays that outline routes to destinations, the types of maneuvers to be taken at various locations along the routes, locations of certain types of features, and so on.

In order to provide these and other navigating functions, present navigation systems include navigation application software programs and use one or more detailed databases that include data which represent physical features in geographic regions. The detailed database(s) includes data which represent the road network in a region, including the roads and intersections in the region and information about the roads and intersections, such as turn restrictions at intersections, speed limits along the roads, street names of the various roads, address ranges along the various roads, and so on. Further, the data may include information about points-of-interest such as museums, national parks, restaurants and the like. Presently, the collection of such geographic data and the provision of such data in a computer-usable database format are provided by Navigation Technologies of Rosemont, Illinois.

Present navigation application programs and navigation systems are able to provide many advantages and many useful features. However, there continues to be a need for improvement. One area in which there is need for improvement relates to providing an efficient method of implementing a smooth scrolling display feature.

Smooth scrolling generally permits a user to browse the map on a map display. This feature permits the user to examine a portion of a map away from a present position of a vehicle. One method of generating a smooth scrolling map is accomplished by retrieving data from a database and updating an edge of a displayed map as the map moves on the display in a given direction. This form of smooth scrolling can lead to difficulties in name placement for features shown on the map because the retrieved strip of information may not be large enough to hold the full feature name. Also, unnecessary duplication of names may occur. Further, updating a display in strips can occasionally lead to discontinuities in roads and other features and presents a less precise rendering of a map region.

Accordingly, it is an objective to provide a navigation application that provides improved map scrolling in a navigation application.

SUMMARY OF THE INVENTION

According to one aspect of the present invention, a map display tool is provided having a map processing layer, a graphics interface layer, and a primitive layer that separates the graphics platform dependent tasks from graphics platform independent tasks. The map processing layer preferably contains a scrolling function for providing a substantially smooth scrolling map image on a display. The map processing layer communicates with a navigation application program for instructions and a map database for information necessary to carry out the map rendering instructions. The graphics interface maintains at least one table of drawing attributes required by the map processing layer. The primitive layer preferably communicates directly with graphics platform and populates the tables in the graphics interface layer.

According to another aspect of the present invention, a method of smooth scrolling map information on a navigation system display is disclosed. The method includes the steps of providing first and second graphics buffers. The first graphics buffer contains map information regarding a first location, and the second graphics buffer holds map information regarding a predicted future location. While a map area is shown and scrolled from map information in the first graphics buffer, a look-ahead process creates an auxiliary map in the second buffer. When the map area that is shown on the display reaches or approaches the edge of the map information stored in the first buffer, the map information from the second buffer is copied into the first buffer and the process repeats.

BRIEF DESCRIPTION OF THE DRAWINGS

FIG. 3 is a block diagram illustrating the organization of a polyline data item.

FIG. 4 is a block diagram illustrating the organization of a polygon data item.

FIG. 5 is a block diagram illustrating the organization of a point data item.

DETAILED DESCRIPTION OF THE PRESENTLY PREFERRED EMBODIMENTS

I. NAVIGATION SYSTEM OVERVIEW

Figure 1:
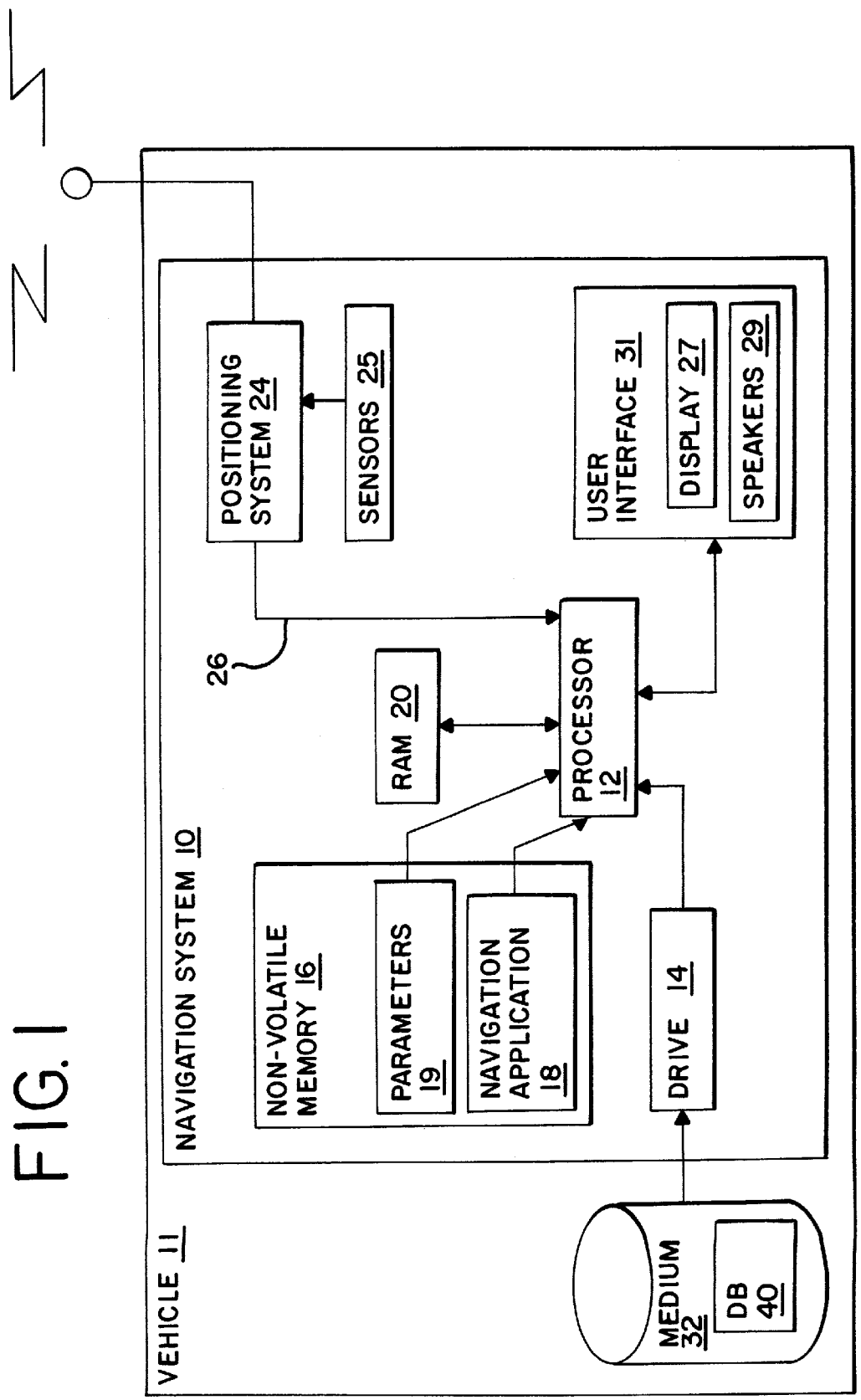
FIG. 1 is a block diagram of an exemplary navigation system.

Referring to FIG. 1, there is a block diagram of a navigation system 10. The navigation system 10 is installed in a vehicle 11, such as a car or truck, although in alternative embodiments, the navigation system 10 may be located outside of a vehicle or may be implemented in various other platforms. For example, the navigation system may be implemented as a hand-held portable system, or may be implemented on a personal computer (such as a desktop or portable notebook) or a personal digital assistant. The navigation system may also be implemented in a networked environment or on a client-server platform.

In the embodiment illustrated in FIG. 1, the navigation system 10 is a combination of hardware and software components. In one embodiment, the navigation system 10 includes a processor 12, a drive 14 connected to the processor 12, and a non-volatile memory storage device 16 for storing a navigation software program 18, as well as other information, such as configuration parameters 19. The processor 12 may be of any type used in navigation systems, such as 32-bit processors using a flat address space, such as a Hitachi SH1, an Intel 80386, an Intel 960, a Motorola 68020 (or other processors having similar or greater addressing space). Processor types other than these, as well as processors that may be developed in the future, are also suitable.

The navigation system 10 may also include a positioning system 24. The positioning system 24 may utilize GPS-type technology, a dead reckoning-type system, or combinations of these, or other systems, all of which are known in the art. The positioning system 24 may include suitable sensing devices 25 that measure the speed, direction, and so on, of the vehicle. The positioning system 24 may also include appropriate wireless communication technology to obtain a GPS signal, in a manner which is known in the art. The positioning system 24 outputs a signal 26 to the processor 12. The signal 26 may be used by the navigation software program 18 that is run on the processor 12 to determine the location, direction, speed, etc., of the navigation system 10.

The navigation system 10 also includes a user interface 31. The user interface 31 includes appropriate equipment that allows the end-user to input information into the navigation system. This input information may include a request to display a location on a map in a desired manner. The input information may also include other kinds of information, such as configuration information or vehicle information. The equipment used to input information into the navigation system may include a keypad, a keyboard, a microphone, etc., as well as appropriate software, such as a voice recognition program. The user interface 31 also includes suitable equipment that provides information back to the end-user. This equipment may include a display 27, speakers 29, or other means.

The navigation system 10 uses a map database 30 stored on a storage medium 32. The storage medium 32 is installed in the drive 14 so that the map database 30 can be read and used by the navigation system. The storage medium 32 may be removable and replaceable so that a storage medium with an appropriate map database for the geographic region in which the vehicle is traveling can be used. In addition, the storage medium 32 may be replaceable so that the map database 32 on it can be updated easily.

In one embodiment, the storage medium 32 is a CD-ROM disc. In an alternative embodiment, the storage medium 32 may be a PCMCIA card in which case the drive 14 would be substituted with a PCMCIA slot. Various other storage media may be used, including fixed or hard disks, DVD (digital video disks) or other currently available storage media, as well as storage media that may be developed in the future. The map database 30, or portions thereof, may also be provided to a vehicle or computer via wireless transmission.

Figure 2:
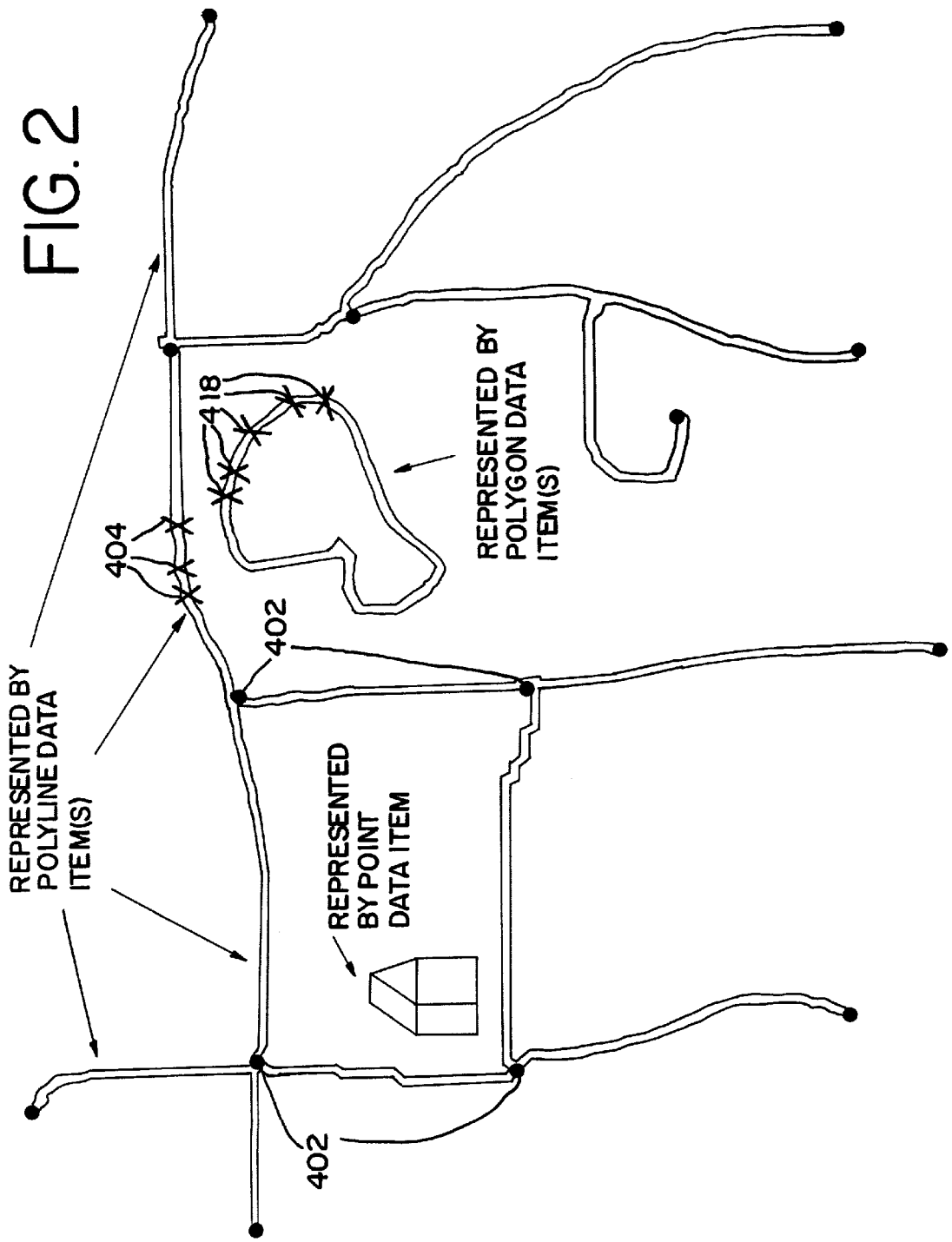
FIG. 2 is a map illustrating geographic features in a portion of a geographic region represented by the geographic database in FIG. 1.

The map database 30 contains information about geographic features, the roadway network, and points of interest in a geographic region. FIG. 2 shows a map illustrating features represented by information in the map database. Features such as roads, railroads, ferries, bridges, and tunnels are represented by polyline information in the map database. Lakes, parks, airports, and other features displayed as areas are represented by polygon information in the map database. Points of interest such as museums or restaurants are represented as point information in the map database. Polylines, polygons and points are supplied by the map database in a respective one of three forms of data items. FIGS. 3–5 illustrate these different data items that the map database supplies to represent the geographic features in FIG. 2.

Referring to FIG. 3, there is a diagram showing the structure of one of the polyline data items 400 representative of a feature shown in FIG. 2. A polyline data item represents a continuous linear geographic feature located within a geographic area. Each of the polyline data items provided by the map database may represent a continuous linear geographic feature such as a portion of a road, a railroad track, a ferry route, a river, and so on. The geographic feature represented by the polyline data item may be straight or other-than-straight. Each polyline data item 400 contains start position data 402 identifying the start point (latitude and longitude) of the continuous linear geographic feature. Each polyline data item 400 also contains one or more delta shape points 403 used to calculate shape points 404 (FIG. 2) located along the continuous linear geographic feature, a data item identifier 406 that uniquely identifies the type of information (polyline, polygon, point, or other) the data item represents and its location in the map database, and other data. Each of the delta shape points 403 provides a relative x, y distance from the previous delta shape point for calculating the shape points 404 through which the line will be drawn. In an alternative embodiment, the polyline data item may include information which identifies the geographic coordinates (latitude and longitude) of the starting point and the end point.

If the continuous geographic feature represented by the polyline data item 400 is other-than-straight, the polyline line data item includes delta shape points 403 which define the shape of the continuous linear feature by relative x, y distance between delta shape points. Alternatively, each of the points may be specified as the geographic coordinates (latitude and longitude) of one or more physical locations through which the continuous linear geographic feature passes.

FIG. 2 shows exemplary shape points 404 located along the portion of the road represented by a polyline data item 400. The curving geographic feature is reproduced on the display by using the delta shape points to generate shape points, and drawing straight lines from shape point to shape point beginning with the start position 402. The number of delta shape points provided for a given shape depends on the shape of the curve and the accuracy or resolution desired in the reproduced display. Although the terminology "shape point" is used in this specification, it is understood that other terminology could be used to refer to a position or locus along a straight or curving geographic feature.

Referring again to FIG. 3, the polyline data item also includes data item identifier data 406 indicating the type of data item. The polyline data item 400 contains feature information 412 identifying the map feature that the data item is carrying. For example, the feature information 412 may include data indicating that the polyline data item represents a limited access expressway, a tollway, a bridge, a ferry, an alley, a side street, a railroad track, a river, and so on. The polyline data item may also contain name data 408 for the feature it represents, layer information 410 describing the database layer that the feature came from, and other information. Roads are often assembled through processing multiple polyline data items 400, each polyline data item corresponding to a road segment defined by a starting position and delta shape points.

FIG. 4 illustrates the structure of a polygon data item 414. Similar to polyline data items 400, polygon data items 414 contain start position information 416, delta shape points 418, feature name information 420, a data item identifier 422, layer information 424, and information 426 describing the feature type contained in the data item 414. A data item does not always correspond to an entire physical feature like a lake or park. For example, a large lake such as Lake Michigan may be provided in multiple polygon data items 414.

FIG. 5 shows the point data item 428 structure. Point data items 428 are typically displayed as an icon on a display. The point data item contains point position data 430 describing the latitude and longitude of the point of interest. Although the point data item 428 does not require delta shape point information, it also contains the feature name 432, a data item identifier 434, database layer information 436, and a feature identifier 438.

As indicated above, the geographic data of the map database 30 is preferably organized in layers. The map display tool may use data at different levels of detail; for example, the navigation application instructs the map display tool to provide information for zooming. Zooming can be done more efficiently if the data are organized into layers, with greater detail at the lower layers and less detail at the higher layers. Therefore, within some of the subsets of data types, the geographic data are provided in separate collections or groups corresponding to separate layers.

As an example, each road segment data record in the map database 30 also identifies the rank of the corresponding portion of the roadway that it represents. A rank of a road segment may correspond to its functional class. Road segments having a rank of "4" may include high volume, controlled access roads, such as expressways and freeways. Road segments having a rank of "3" may be high volume roads with few speed changes, but are not necessarily controlled access roads. The lower ranked roads handle corresponding lower volumes and generally have more speed changes or slower speeds. Road segments having a rank of "0" can handle the lowest volumes. For example, these may include side streets, alleyways, etc.

The rank of a road segment data entity also specifies the highest data layer in which a road segment is included. For example, the cartographic data may include five separate layers of the data, C0, C1, C2, C3, and C4, each comprising a separate collection of the cartographic data with a different level of detail, which can be used by the map display tool. In the cartographic data of the geographic database, layer 0 ("C0") includes the road segments having a rank of "0" or higher. Thus, layer 0 includes road segments corresponding to all the portions of all the roads in the geographic region. Layer 1 of the cartographic data comprises a separate subset (or collection) of the cartographic data and includes only the cartographic data items (and some or all of their corresponding feature attributes) having a rank of "1" or higher. Layer 2 of the cartographic data comprises a separate subset of the cartographic data and includes only the cartographic data (and some or all of their corresponding feature attributes) having a rank of level 2 or higher, and so on. A highest layer (layer n) includes only records having a rank of n. In a present embodiment, n is equal to 4, although in other embodiments, n may be any number greater than 0. Each higher layer includes fewer records, however these records represent roads upon which travel is generally faster. Using these different layers of cartographic data, the map display tool can provide rapid panning and zooming. Although the organization of some of the data into layers results in some duplication of the data, the increased efficiency provided by layering generally offsets any disadvantages. In one alternative embodiment, the geographic database 30 may include only one rank of road in each layer. In another alternative embodiment, the database 30 may have a single layer that includes all ranks of cartographic data. Referring again to FIG. 1, the navigation application software program 18 is loaded from the non-volatile memory 16 into a RAM 20 associated with the processor 12 in order to operate the navigation system. The navigation system 10 uses the map database 30 stored on the storage medium 32, possibly in conjunction with the output 26 from the positioning system 24, to provide various navigation features and functions. The navigation software program 18 may include separate applications (or subprograms) that provide these various navigation features and functions. These functions and features may include route calculation, map display, vehicle positioning (e.g., map matching), route guidance (wherein detailed directions are provided for reaching a desired destination), destination resolution capabilities, and other functions.

II. THE MAP DISPLAY TOOL PROGRAM

A. Overview

Figure 6:
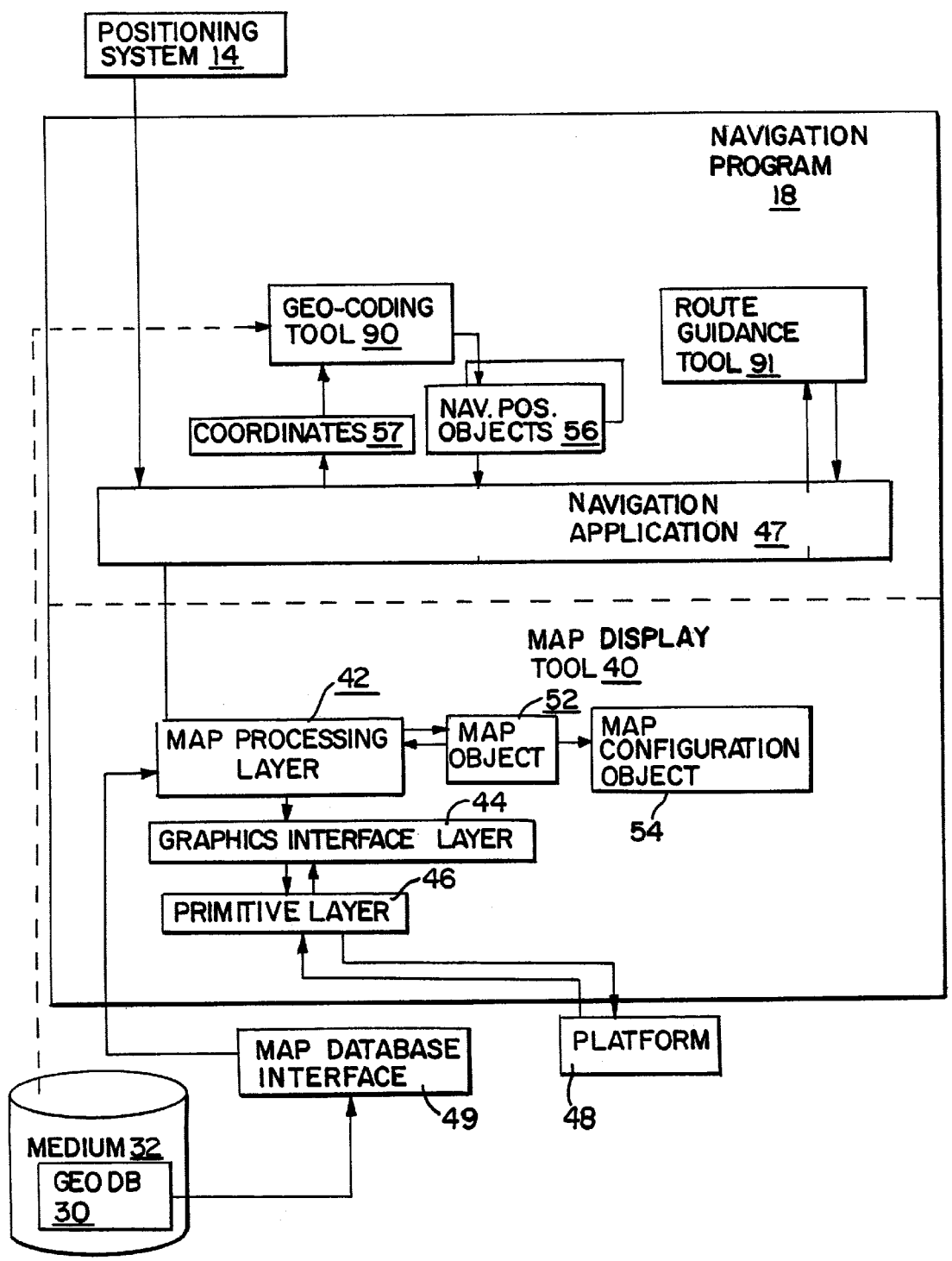
FIG. 6 is a block diagram showing components of the navigation application program of FIG. 1.
Figure 7:
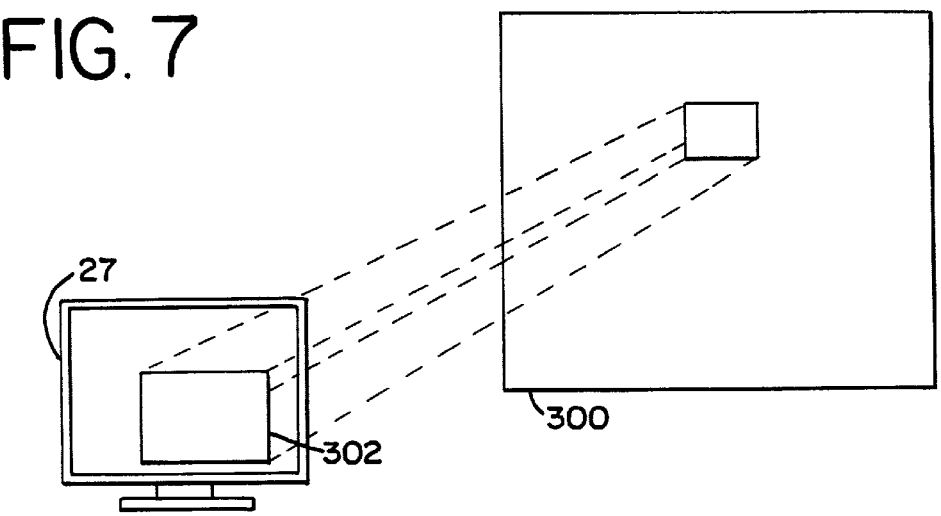
FIG. 7 illustrates a relationship between a virtual map represented by data in the map database of FIG. 1 and a map rectangle shown on a display.

Referring to FIG. 6, in the navigation software program 18 the map generation and display capabilities are provided by a map display tool 40. The map display tool 40 is a computer program that may be used as part of the navigation software program 18. The map display tool 40 generates maps from the map data in the map database 30 for specified locations that may either be rendered directly to a display or to a graphics buffer. FIG. 7 illustrates the concept of a virtual map 300 in relation to the map rectangle 302 that is presented for viewing on the display 27. The virtual map 300 represents the geographic area described by map data available in the database 30. The map rectangle 302 is a portion of the virtual map 300 shown on the display, via the map display tool 40, by the navigation software program 18.

If used with a navigation software program 18 in a navigation system installed in a vehicle, the map display tool 40 may be used to render and update a map illustrating the vehicle's location and immediate surroundings. The map display tool 40 may be used in combination with the map database 30 and other programs or subprograms within the navigation program 18, or even with other programs outside the navigation program 18 or navigation system 10. Specifically, in the navigation software program 18, the map display tool 40 interfaces with a navigation application 47. The navigation application 47 may include appropriate programs that provide the remainder of the navigating functions provided by the navigation system 10, such as route guidance, vehicle positioning, the user interface, and so on. Alternatively, the navigation application 47 may operate as a manager that uses other tool programs, such as a geo-coding tool 90, a route guidance tool 91, a route calculation tool, and so on, to implement one or more of the other various navigation functions.

The map display tool 40 is provided as a module that is relatively portable and that can be incorporated into different kinds of systems. The map display tool 40 employs an object oriented approach to both its programming, its use of data, and its relationship to the navigation application 47. Each object that forms the map display tool receives input data and generates output data according to a predefined function and may invoke methods on other objects. Another version of a map display tool is described in U.S. patent application Ser. No. 09/047,141 filed Mar. 24, 1998, the entire disclosure of which is incorporated herein by reference. In one present embodiment, each object has its own private memory which is opaque to other objects. In the disclosed embodiment, an object may be used to convey data from one object to another object or may be used to transform data received as input. The map display tool 40 is written in the C programming language although in alternative embodiments other programming languages may be used, such as C++ or Java. In general, programming languages that support object oriented programming are preferred.

B. Structure of the Map Display Tool Program

In a preferred embodiment, the map display tool 40 comprises a map processing layer 42, a graphics interface layer 44 and a primitive layer 46. Each of the three layers in the map display tool contains data structures and/or functionality to carry out requests for creating and rendering a map. The map display tool 40 receives input from the navigation application 47. The map display tool also receives map information from a database via a map database interface 49. The map display tool executes graphics processing functions of the particular graphics platform 48 utilized by the navigation application so that the map requested by the navigation application and created from the data retrieved from the map database may be shown on the display 27, sent to a buffer, or sent to a data file. Suitable graphics platforms may be X-Windows, MetaWindow, WIN32, or any of a number of existing platforms supporting graphics.

(1). The map processing layer.

Figure 8:
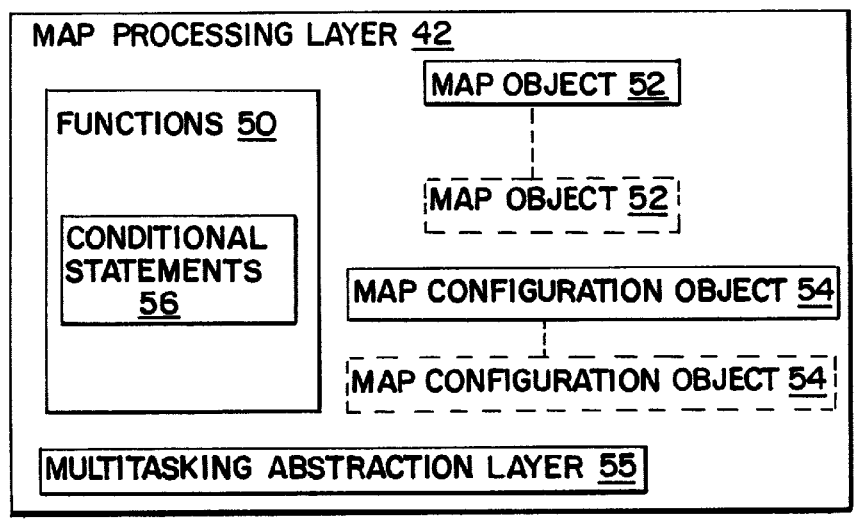
FIG. 8 is a diagram illustrating the map processing layer of the map display tool shown in FIG. 6.

The map processing layer 42 provides the essential map display and manipulation capabilities of the map display tool 40. These capabilities include the creation, destruction and management of map data structures, preferably map objects 52 and map configuration data structures, preferably map configuration objects 54. Referring to FIG. 8, the map processing layer 42 includes a function set 50, at least one map object 52, at least one map configuration object 54, and a multi-tasking abstraction layer 55. The function set 50 preferably includes a smooth scrolling function as well as other functions such as data retrieval operability, map projection, map rotation, general scrolling capability, and zooming. The function set 50 incorporates a number of conditional statements 56 to allow the navigation application to customize operation of the map display tool 40. Each map object 52 represents an independent map display area. Each map object 52 is associated with a map configuration object 54. The multi-tasking abstraction layer 55 supports objects and functions necessary to implement the smooth scrolling feature described below.

The navigation application communicates map area information and map database search criteria to the map processing layer. The map processing layer retrieves data from the map database, via the map database interface 49, based on the application's instructions. In one embodiment, the map area information consists of the center point of the desired map area, in latitude and longitude coordinates, and the map scale. The map scale is the number of meters in the real world that each pixel on the display represents. With this information, the map processing layer calculates the map area to be retrieved. Although the map area calculated for retrieval preferably comprises a rectangular area, the boundaries of the area retrieved may have other predetermined shapes.

The information sent from the navigation application also preferably includes graphics preferences and settings information such as the database layer desired, the features desired from that layer, and the feature attributes associated with the feature. The features in a database layer may include items such as airports, aircraft roads, cities, counties, countries, golf courses, lakes, rivers, national parks, road networks, railroads and the like. The feature attributes refer to colors, fill styles, polygon border styles and other aspects of how a feature is to appear on the display. The map processing layer retrieves map information in the form of data items (400,414,428) and processes one data item before retrieving the next.

As explained in greater detail below, the retrieved information in each data item is processed in different ways based on several factors. These factors include the nature of the retrieved data item and information stored in the map object 52 and the map configuration object 54.

(a) The Map Object

Figure 9:
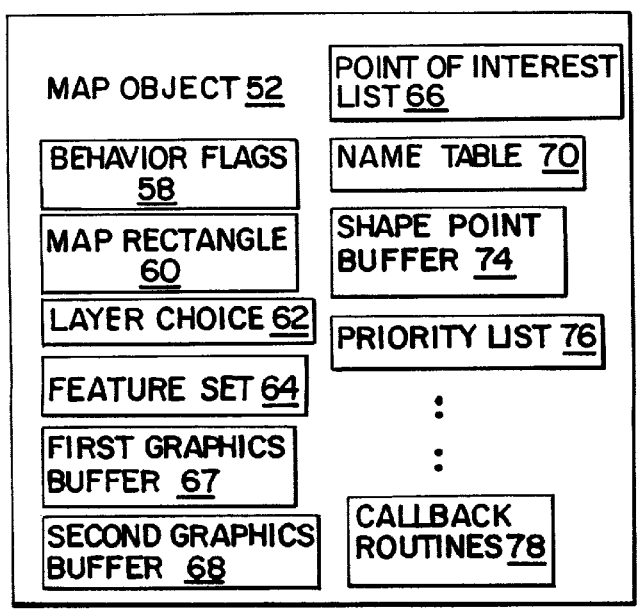
FIG. 9 is a diagram illustrating the components of the map object shown in FIG. 8.

The map object 52 is best shown in FIG. 9. The map object 52 represents a collection of map settings, preferences and retrieved data storage for a designated geographic area. The map object contains information relating to the boundaries, contents and appearance of the map to be created and rendered. The map processing layer may handle multiple map objects, each associated with a different geographic area.

For each map object, the navigation application provides behavior flags 58 and map area information in the form of map rectangle information 60. The behavior flags 58 affect how the map object will behave at various points of decision. For example, in one embodiment, a flag included in the behavior flags determines whether smooth scrolling of map information on the display has been requested. Other behavior flags include a point of interest icon flag that indicates whether point of interest icons will be rendered. The navigation application may communicate preferences for layer choice 62, the desired feature set 64 of information retrieved from the designated layer, and other settings. Layer choice 62 refers to which database layer to select. The feature set 64 determines the feature types (e.g., lakes) to retrieve from the layer. A priority list 76 in the map object contains a list of feature types and is used for determining the priority of placement of names for roadways, points of interest and roadway shields (e.g., the red, white, and blue shield icon of a U.S. interstate freeway) on a rendered map.

Figure 10:
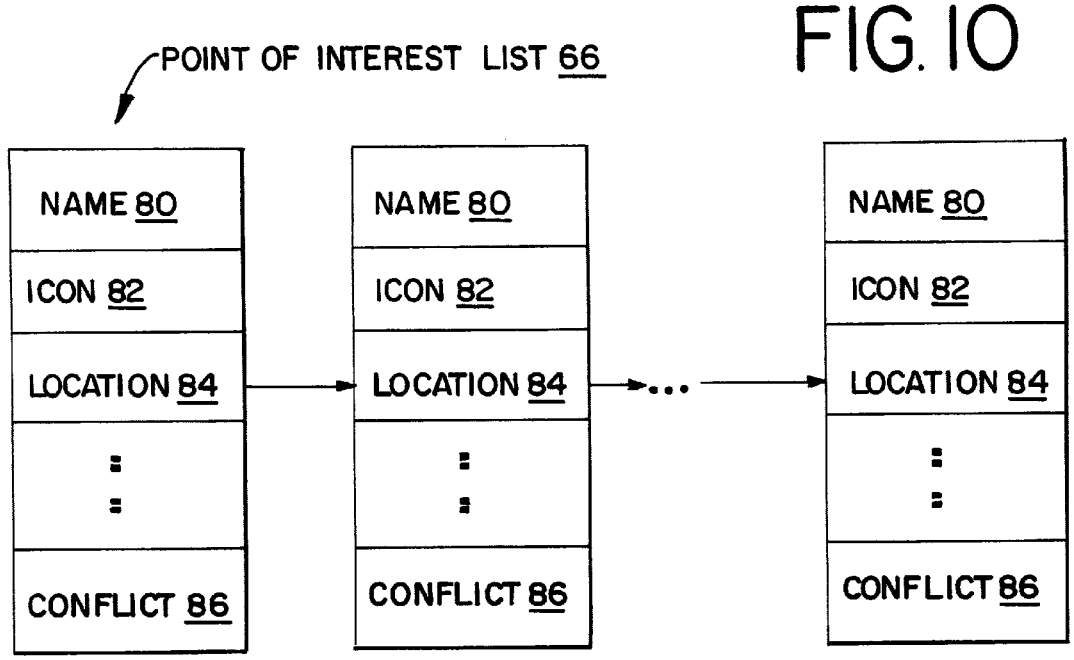
FIG. 10 is a diagram illustrating a component of the map object of FIG. 9.

The map object 52 also contains several dynamic data storage locations for holding specific types of retrieved information. At least two graphics buffers 67, 68 are located in the map object 52 if smooth scrolling is desired. Each of the graphics buffers is preferably configured to store the graphics information rendered from the map data retrieved from the map database. A point of interest list 66 maintains a list of all point of interest names that are retrieved by the map display tool during a map rendering process. Points of interest may include cities, museums, government offices, national monuments, restaurants and other unique locations within the map area rendered. As shown in FIG. 10, the point of interest list 66 is preferably a singly linked list containing name 80, icon 82, and location 84 information on each retrieved point of interest. As described below with respect to the name placement functionality of the map display tool 42, a conflict indication flag 86 is also included so that points of interest that do not overlap or interfere with higher priority names or icons designated for display may be marked.

Figure 11:
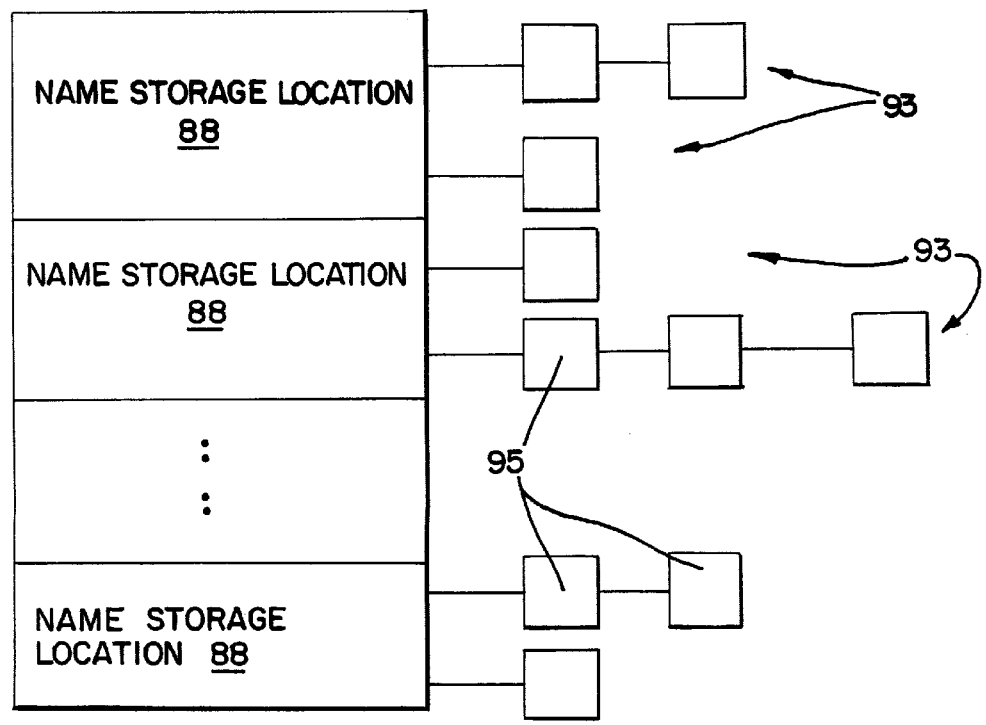
FIG. 11 is a diagram illustrating the components of the name table in the map object of FIG. 9.

The map object initially holds retrieved roadway name and roadway shield information in a separate list from the point of interest list 66. The roadway name and roadway shield information retrieved from the database for the designated map rectangle 60 are placed in a name table 70. Referring to FIG. 11, the name table 70 may be a hash table having an array of name storage locations 88. The name storage locations 88 each hold two lists 93 of information: a list of roadway name information and a list of roadway shield information. The location(s) of each roadway name or shield 13 are also placed in the record created for the name or shield. As the map processing layer of the map display tool reads in each data item from the database, the name information is either run through a hashing function if it is a roadway name or roadway shield and placed in the name table, or placed in the point of interest list.

The shape point information retrieved from the map database is directed to a shape point buffer 74 in the map object 52. Unlike the name table 70 and point of interest list 66, the shape point buffer is a temporary buffer for shape point data and preferably only holds shape point data for one retrieved data item at any given time. Other information retained in the map object 52 includes callback routines 78 provided by the navigation application to substitute for default map display tool behavior. As addressed at length below, the map display tool offers flexibility through the use of conditional statements in the functions 50 of the map processing layer 42 to permit substitution or insertion of customized functionality by the navigation application 47.

(b). The Map Configuration Object

Figure 12:
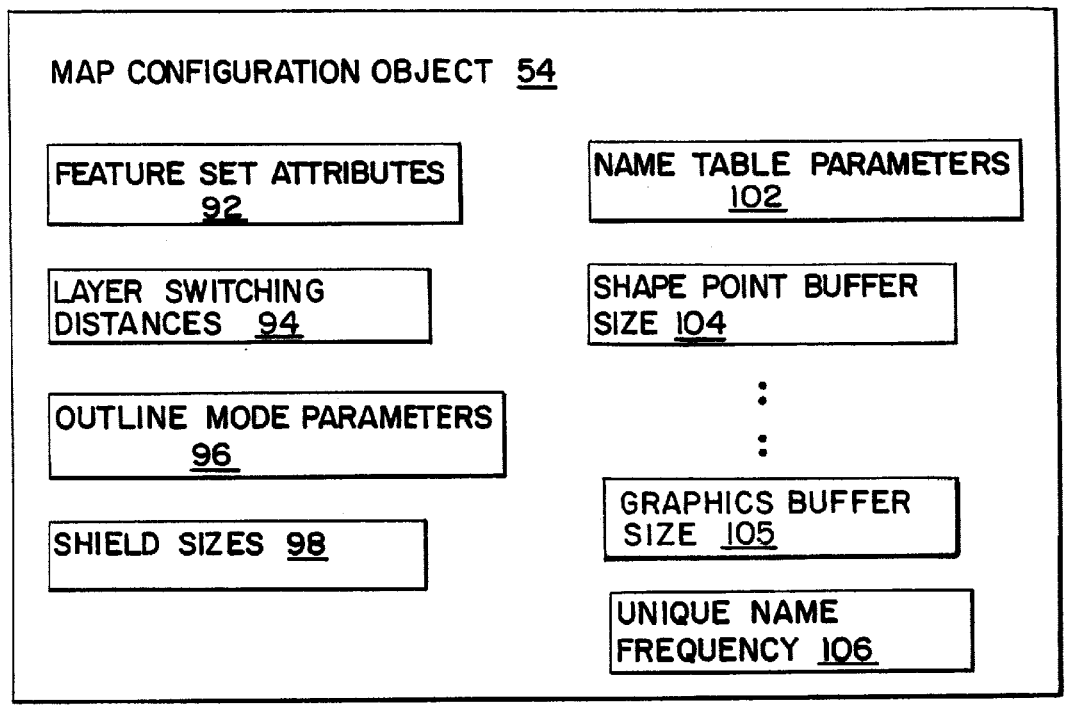
FIG. 12 is a diagram illustrating the components of the map configuration object of FIG. 8.

Referring to FIGS. 8 and 12, the map configuration object 54 represents a template containing settings on the size of storage areas, such as tables and lists, created in the map object 52. The map processing layer 42 may contain multiple map configuration objects 54. Each map object 52 is associated with a map configuration object 54. The map configuration object preferably includes settings that typically do not change at runtime. More than one map object 52 may be associated with the same map configuration object 54.

The map configuration object may include desired feature attributes 92, layer switching distances 94, outline mode parameters 96, point of interest icon size 98, and roadway shield icon size 100. Feature attributes 92, as mentioned above, comprise line thickness, color choice, fill styles, polygon border styles and other aspects of how a feature (e.g., road, park, lake, etc.) is to appear on the display. Layer switching distances 94 are the points at which the map display tool adds or deletes information from the display corresponding to the next higher or lower information layer in the map database. The layer switching distances may be tied to the width of the geographic area shown in the map rectangle on the display. For example, if the layer switching distance between layers 3 and 4 is 35 miles, and the width of the map region shown in the map rectangle changes from 40 miles to 30 miles, the information layer displayed will switch from layer 4 (major roads and lakes) to layer 3 (layer 4 data in addition to smaller roads and other features). Outline mode parameters 96 are data relating to the parallel line representation of roads. The outline mode parameters include information such as the threshold, in terms of the map scale being displayed, at which roads are drawn as parallel lines (as opposed to single lines). The outline mode parameters 96 also include the width that roads of different ranks will be drawn.

Object parameters, such as the name table parameters 102, shape point buffer size 104, and graphics buffer size 105 are also held in the map configuration object 54. Each of the object parameters are size and shape settings for the memory space (tables, lists, etc.) created in a map object.

c) The Multi-tasking Abstraction Layer

Figure 13:
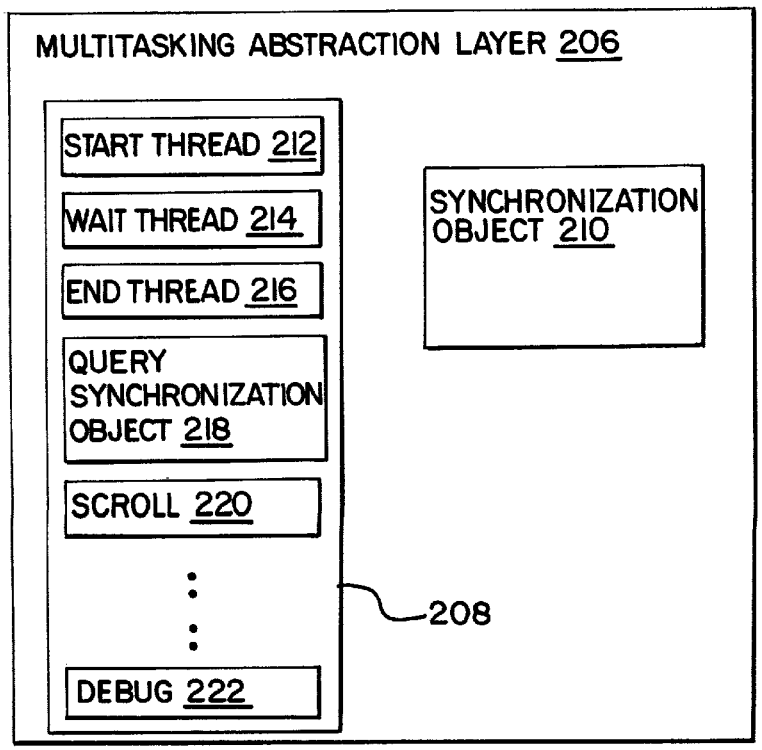
FIG. 13 is a diagram illustrating the multi-tasking abstraction layer shown in the map processing layer of FIG. 8.

Referring to FIG. 13, the multi-tasking abstraction layer 55 contains a list of function hooks 208 necessary from the underlying platform 48 for implementing the multiple threads (i.e., multi-tasking) used to support smooth scrolling. These function hooks 208 are preferably satisfied with platform specific routines supplied by an application programmer for the navigation application. Thus, an advantage of the multi-tasking abstraction layer is its usefulness in facilitating portability of the smooth scrolling function. While multi-tasking issues are generally very platform dependent, the multi-tasking abstraction layer 206 provides function definitions to a navigation application programmer. In this manner, the navigation application programmer can use any of a number of software platforms to obtain the smooth scrolling capability discussed herein. The multi-tasking abstraction layer 206 provides a framework of functions that are recognized by the map display tool. A navigation application programmer need only supply to this framework the platform specific function calls that satisfy the function requirements of the multi-tasking abstraction layer. Thus, the need to revise and customize the entire map display to satisfy a particular platform is avoided. The multi-tasking abstraction layer 206 also includes a synchronization object 210 created by the navigation application that is used by the various functions 208 to coordinate different threads running in the map display tool and the navigation application. The synchronization object 210 is preferably passed between the navigation application and the map display tool depending on which of the two are actively using platform supported functions. In essence, the synchronization object 210 is an authorization to utilize the platform functions and guarantees that there are no conflicts between the navigation application and the map display tool during multi-tasking.

The list of functions 208 in the multi-tasking abstraction layer 55 includes a start thread routine 212 that initiates map rendering in the auxiliary virtual space 204 upon receipt of both the synchronization object 210 and a temporary map object. When the start thread routine 212 is finished, it releases the synchronization object 210 and indicates completion of the successful operation. The wait thread routine 214 is a function that determines if a background process is still running and waits to initiate another process until the synchronization object 210 is free for use by the map display tool. An end thread routine 216 terminates any active thread and releases the synchronization object 210 held bythethread.

A query synchronization routine 218 is functional to examine the synchronization object 210 and return its status without interfering with the thread utilizing the synchronization object at the time. A scroll routine 220 inquires as to the intent of the navigation application with regard to the smooth scrolling function. The scroll routine 220 forwards current scroll amounts (i.e., pixels) by which the screen display in the virtual space stored in the buffer is moved. In response to the scroll function, the navigation application may return a stop scrolling command that stops the scrolling of information on the display and refreshes the display with any data that has not been rendered during the scrolling process. The application may also return a continue scrolling command that temporarily stops the scrolling and does not refresh the display with data that was rendered during scrolling. The continue scrolling command indicates that the navigation application will continue scrolling in the same or a different direction. In one embodiment, the user or navigation application programmer may select to omit certain data when scrolling so that unnecessary refreshing of screen data is avoided. Excessive screen refreshing can lead to discontinuities on the display. Thus, the continue scrolling command may be used to prevent refreshing the screen with omitted items until the navigation application indicates that scrolling is complete.

Finally, the application may also return an integer value of the scrolling speed to the scroll routine 220. A debug function 222 may also be provided in the function list 208 so that the navigation application programmer has a means for debugging thread synchronization problems. As indicated above, the abstraction layer 55 is designed so that an application programmer will provide the platform specific commands and routines to fulfill the function defined by the function requirements 208 so that the smooth scrolling feature is available for use with any of a number of existing graphics platforms 48.

(2). The Graphics Interface Layer

Figure 14:
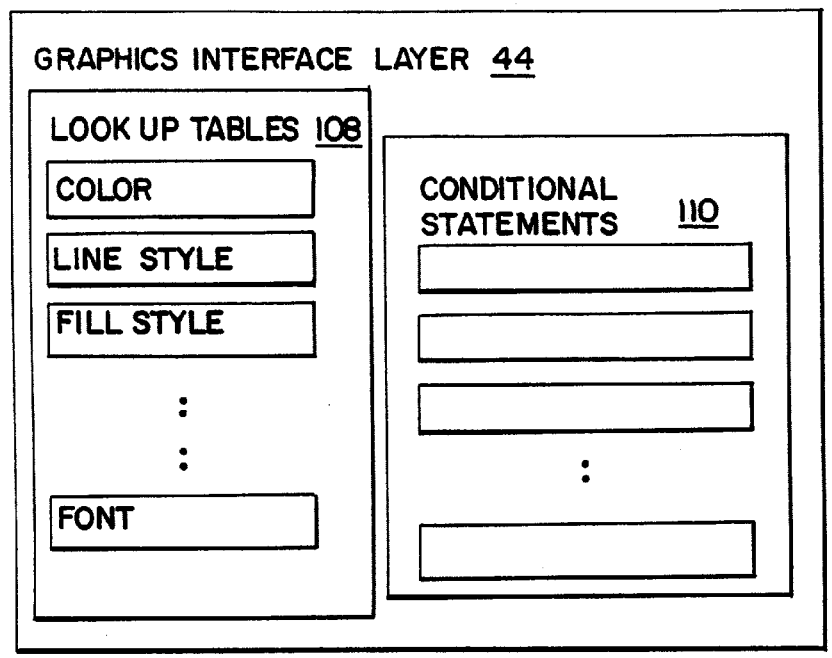
FIG. 14 is a diagram illustrating the data structure of the graphics interface layer of FIG. 6.

When the map display tool 40 is initialized, the map processing layer 42 is initialized first and then the map processing layer requests that the graphics interface layer 44 initialize itself. Referring to FIG. 14, the graphics interface layer 44 comprises look up tables 108 and conditional statements 110. The look up tables 108 provide a graphics abstraction for the map processing layer 42 for all graphic operations. Each of the look up tables 108 contains a drawing attribute, such as color, line style, fill styles, fonts, etc. As an example, the look up table 108 for colors preferably has a first column of assigned ID numbers which serve as indices into the look up tables maintained by the graphics interface layer 44. The second column in the look up table 108 is populated by plafform-specific data types supported by the underlying graphics platform. Population of each look up table occurs at startup and is performed by the primitive layer 46. The graphics interface layer 44 thus serves to create a generic graphics interface where the map processing layer 42 can request particular graphics functions by ID number and the graphics interface layer will translate the requested ID number into a supported data type. The map processing layer does not need to know how a graphics function is performed, it only requires that the function be available. The graphics interface layer, via the look up tables 108, facilitates platform independence for the map processing layer.

An element that provides for the graphics abstraction between the map processing layer and primitive layer/ graphics platforms are a plurality of hooks, or conditional statements 110, which provide flexibility for processing drawing requests from the map processing layer and navigation application. The conditional statements 110 in the graphics interface layer 44 act as markers for allowing the application program to substitute customized drawing routines for the default ones in the graphics interface layer. The conditional statements 110 provide flexibility for the application to modify the way graphics are represented on the display. Examples of conditional statements which may be contained in the graphics interface layer are a polyline hook, a polygon hook, a text string hook, text string extents hook, bitblock transfer, icon, view port, and clip region.

The polyline and polygon hooks cause the graphics interface layer 44 to check whether the navigation application is providing customized routines for drawing a polygon or polyline. The text string hook directs the graphics interface layer to determine if a custom text generation routine is requested by the navigation application. Each text string rendered in a map takes up a certain amount of space on a display. A text string extents hook checks to see if the navigation application wants to use a particular method for determining the space, i.e., the extents, the text string occupies.

The bitblock hook causes the graphics interface layer to determine whether the navigation application desires a special routine for transferring bits of information from a graphics buffer to a display. For example, if the map display tool is configured to first draw a map to a graphics buffer rather than directly to a display, a block of individual bits representing the map image is stored in the graphics buffer. A bitblock transfer routine is necessary to move the map image in the graphics buffer to the display. The graphics interface layer will use the default routine available in the underlying platform unless the hook indicates a customized routine from the navigation application.

The icon and viewport hooks serve to check whether customized routines for generating icons or defining the viewport area on the display are available. Icons are small bitmap images representing a picture or place. Icons may be generated by the map display tool to show, for example, points of interest on a map. The viewport represents the map rectangle, or geographic area, shown on the display. The clip region hook looks for a clip region routine that can inform the graphics platform of graphics output limitations within a map rectangle. Graphics platforms typically already know to limit graphics output to the edges of a window (such as a map rectangle). In some instances, however, the navigation application may require that graphics output be limited to certain boundaries within the map rectangle. The clip region hook allows the navigation application to supply an appropriate routine to accomplish this task. Each of the drawing functions represented by the conditional statements 110 have default routines stored in the graphics interface layer which maybe omitted, invoked or substituted for by the navigation application.

(3). The Primitive Layer

According to a preferred embodiment, the primitive layer 46 of the map display tool 44 is designed to communicate directly with the specific platform 48 used. The primitive layer is specific to the platform and performs two basic functions. At initialization, the primitive layer first fills the lookup tables of the graphics interface layer 44 with platform specific information on colors, etc., and provides callback routines to the conditional statements in the graphics interface layer. The second function of the primitive layer 46 is to carry out the instructions from the graphics interface layer 44 and draw features directly to the display or a graphics buffer.

III. MAP RENDERING (1). Map Display Tool Preparation

At system start-up, the navigation application 47 prepares the map display tool 40 for use. The navigation application preferably communicates with the map processing layer 42 of map display tool via a predetermined set of function calls. Each function call carries certain data parameters necessary for the map display tool to carry out the requested operation. An initialization function call from the navigation application causes the primitive layer 46 to populate the lookup tables 108 in the graphics interface layer 44 with platform 48 supported graphics functions. A separate function call from the navigation application instructs the map processing layer to generate a map configuration object 54. Once a map configuration object is ready, the navigation application may send a map object function call to prepare one or more map objects 52 for later use during map rendering. The information passed from the navigation application to the map display tool includes the center of the map rectangle and the map scale, the features to be processed from the database, and the database layer to retrieve data from.

(2). The Map Rendering Process

One map rendering process supported by the map display tool described above is shown in FIG. 15. As described above, before beginning the map rendering process the navigation application first specifies the center of the map rectangle, the map scale, and data retrieval criteria for each map object (at step 112). In one embodiment, the map database 30 stores cartographic information in geodetic (spherical) coordinates. In this embodiment, the map processing layer calculates the map rectangle by transforming the center point and map scale information into geodetic coordinates. The map processing layer then calculates the additional area around the map rectangle that will fit into the graphics buffer.

Upon completion of map object preparation, the navigation application sends a map render function call to the map display tool. The map render function call specifies which map object is to be rendered into a map. The map display tool requests information from the map database 30, via the map database interface 49, corresponding to the navigation application's specifications (at step 114).

The map database returns map information in the form of data items 400, 414, 428 (see FIGS. 3–5). According to one embodiment, each data item is retrieved one at a time such that each retrieved data item is fully processed before the next data item is obtained from the database. The map processing layer 42 uses the instructions received from the navigation application 47 to determine the amount of map data to retrieve. The map processing layer 42 retrieves map data that corresponds to the area within the map rectangle as well as map data for the area around the map rectangle that will fill the space available in the graphics buffer. The map processing layer 42 communicates with the map database 30 through a map database interface 49. One suitable map database interface is the SDAL™ software available from Navigation Technologies of Rosemont, Ill.

Assuming there are data items to process, the map processing layer 42 checks to see if processing should continue, and if so, determines where the retrieved data item should be included in the map (at steps 116,118,120). The interrupt hook 122 is a conditional statement 56 in the map processing layer that allows the navigation application to register an interrupt routine in the map rendering process. An interrupt routine may be used so that control is returned to the navigation application. The filter hook 124 in the map processing layer checks to see whether the navigation application has supplied a filter callback routine that the map processing layer will use to select features from the database.

The map display tool 40 may be used to support two types of filtering. First, map features that are not desired at all (e.g., restaurants) may be filtered out by excluding the feature from the feature set 64 in the map object 52. The map display tool will then simply not retrieve any data items containing the excluded feature type. Second, through the filter hook 124, the navigation application may customize treatment of individual examples of a particular retrieved feature. For example, the navigation application may invoke the filter hook to add a routine that only processes Chinese restaurants and ignores all others. A data item containing a feature included in the feature set, and that is not filtered out, continues to be processed in the map processing layer.

In one embodiment, the map display tool processes one data item at a time and the map processing layer does not receive another data item until processing on the previous one is complete. The shape point data, or icon information from each data item is immediately processed and rendered to the appropriate graphics buffer 67, 68. Name information, however, is stored in memory until all data items have been retrieved for the designated geographic region. The name information is then processed and rendered to the graphics buffer.

Figure 15:
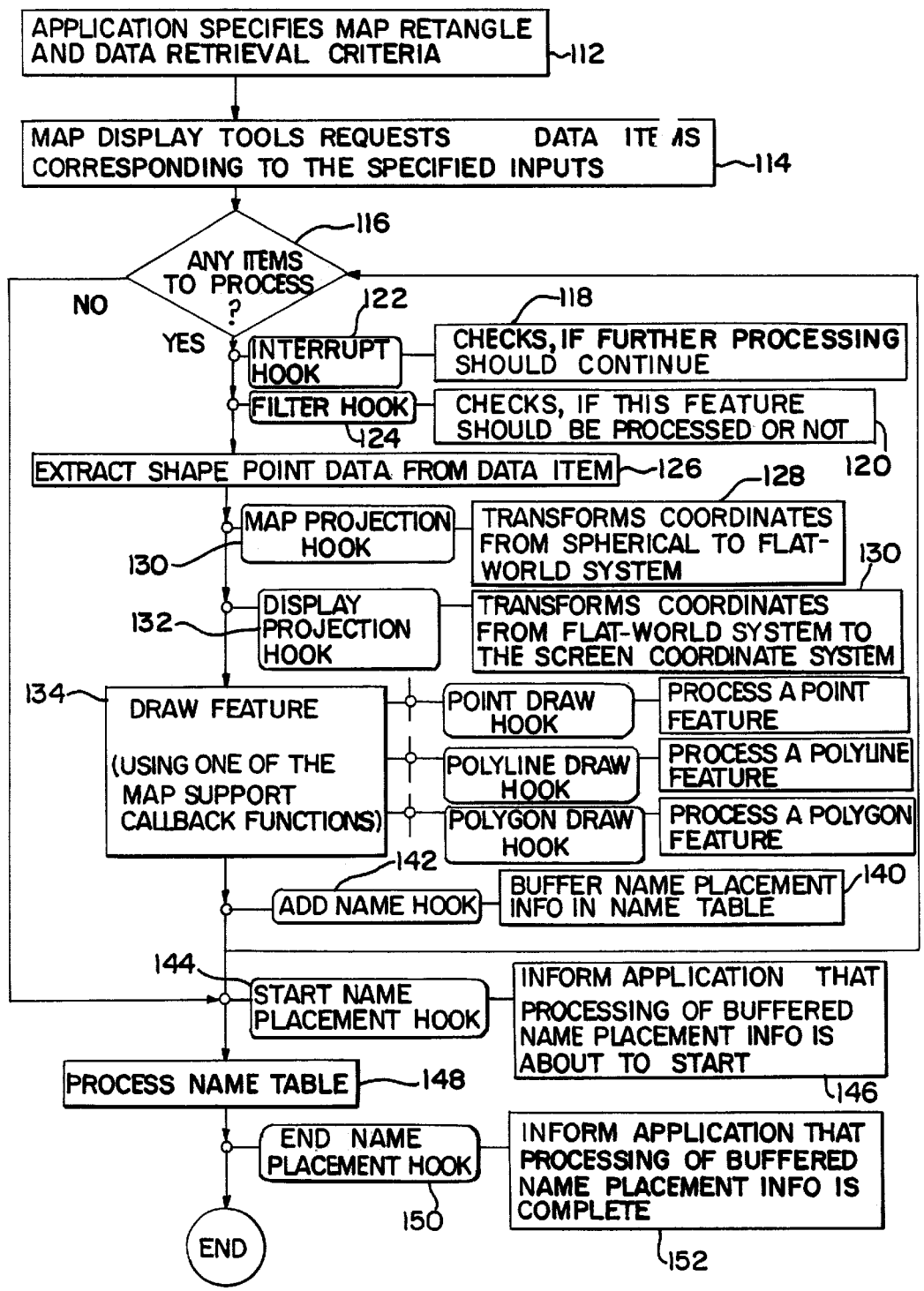
FIG. 15 is a flow diagram illustrating a presently preferred method of rendering a map using the navigation application program of FIG. 6.

FIG. 15 illustrates the process for each data item in greater detail. The map processing layer 42 removes any shape point information from the data item and places the shape point information in the shape point buffer 74 of the map object 52 (at step 126). Shape point data stored in the shape point buffer is preferably in geodetic coordinates. The map processing layer transforms these coordinates from geodetic (spherical) to a flat world coordinate system (at step 128). A map projection hook 130 in the map processing layer will first check to see if the navigation application 47 has designated an alternative transformation function. The flat world system coordinates are subsequently transformed into the screen coordinate system (at step 130). Again, a display projection hook 132 is provided in the map processing layer so that the map processing layer may first check if an alternative routine has been designated by the navigation application. After a data item is retrieved and processed to obtain the shape point data, and after the necessary map and display projections have been applied, the features are rendered to the appropriate graphics buffer (at step 134). Although name information is buffered and not rendered until after all shape point data is rendered, name position information associated with the name information is transformed along with the shape point data so that any rotation or other orientation manipulation applied to the shape point data will also be applied to the name location information.

Figure 16:
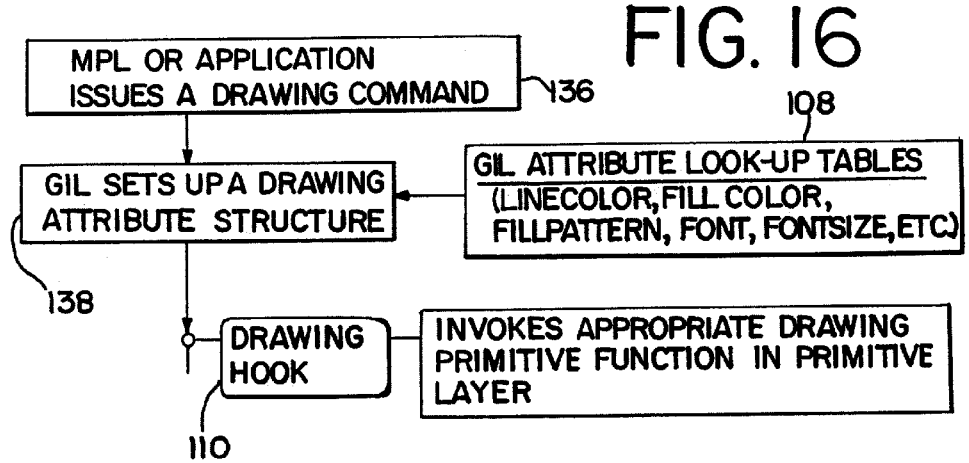
FIG. 16 is a flow diagram illustrating a presently preferred method of rendering a map using the navigation application program of FIG. 6.

FIG. 16 illustrates the sequence of steps carried out when the map is rendered. The actual drawing of each shape is performed by the primitive layer 46 in conjunction with commands sent from the map processing layer 42 and translated in the look up tables in the graphics interface layer 44. First, the command from the map processing layer, or application, is sent to the graphics interface layer (at step 136). The drawing command set contains a set of reference ID numbers defining the drawing attribute structure that the graphics interface layer 44 can translate into instructions understandable by the primitive layer (at step 138). The drawing attribute structure consists of the ID numbers in the command to select the appropriate line color, fill color, font, or etc. required for the map feature. After receiving the drawing command, the graphics interface layer 44 reviews the appropriate drawing hook, or conditional statement 110, resident in the graphics interface layer to invoke the graphics functions supported by the graphics platform 48. As indicated above, the primitive layer filled in the graphics routines from the platform at startup.

Referring again to FIG. 15, after drawing the retrieved map feature to the graphics buffer, any name information associated with the data item is placed in the name table 70 if it is a name or roadway shield, or the point of interest list 66 if it is a designated point of interest (at step 140). A name addition conditional statement 142 again permits configurability of the map display tool so that the navigation application may replace the default name storage routine with one of its own.

After completing the sequence of steps described above for the current data item, the next data item is processed accordingly (see steps 118–140) until all items from the database within the designated area are exhausted. The designated area consists of all of the geographical data that will fit within the graphics buffer at a predetermined scale that is centered at the center point provided by the navigation application. Thus, as each data item is processed, the graphical features are immediately rendered to a graphics buffer and any name information is buffered such that a complete list of all names (roadway names, roadway shields, point of interest names, city names and other name information) are buffered in the name table 70 or point of interest list 66 of the map object 52.

After drawing all the shape data and buffering all the name information, the map display tool 40 begins a name placement routine to determine selection and placement of names on a rendered map from the name table and point of interest list. The map processing layer first looks to a start name placement hook 144 which points to a call back routine that informs the navigation application of the impending name placement processing (at step 146). The map processing layer then initiates name processing (at step 148) and continues processing the buffered names until the buffered names have been exhausted. After completing the name placement routine, the map processing layer checks an end name placement hook 150 and informs the navigation application that processing is now complete (at step 152).

(3). Name Placement Functionality

In a present embodiment, the map display tool implements improved name placement functionality for placing names of map features in an optimal way so as to maximize content of the displayed map while supporting prioritization requirements specified by the navigation application. The name placement functionality of the map display tool preferably also supports implementation of related functionality such as highlighting particular road segments and location queries for displayed point of interest icons. As explained below, a location query is made possible by tagging all point of interest items that pass a conflicts check made during processing of the buffered name information. Because the preferred name placement functionality should support name placement priorities, name placement density and other features, it is necessary that the map display tool treat the name information differently than the shape point buffer information. Thus, instead of rendering each piece of name information as it is processed, name information is buffered until all of the information, corresponding to all of the features in the designated map region in the graphics buffer, becomes available.

In order to keep track of the density of name placement, it is necessary to have the ability to check the number of times that the name has already been buffered. As described above, one preferred storage structure with look-up capabilities is a name table in the form of a hash table. Referring to FIG. 11, to support the hashing function, the size of the hash table (the number of name storage locations 88) is a prime number. Each name storage location 88 in the hash table contains two lists 93 of buffered road names and roadway shield names. Each list 93 is made up of one or more name items 95. Each item 95 is preferably a record containing the name or roadway shield information for the roadway and an array of alternative positions for the name element. As each name is retrieved by the map processing layer 42, the hashing function is first used to map a name into a name storage location 88. Any of a number of commonly available hashing functions may be used.

Once a name storage location 88 is identified, the appropriate list 93 in that location is scanned to see if any of the items 95 in the list already contains the name. If a name is not already in a name storage location, an item 95 may be created in the list and assigned the first available position in the array of alternative positions. Alternatively, if the item 95 already exists in the list 93, then the map processing layer scans the array of alternative positions within the item 95 to see if a position is still vacant. If one is available, the name is placed in that position.

The number of name storage locations 88, the density of names in the rendered map, and the number of times a roadway name or roadway shield may appear (i.e., the number of available positions in an item 95 in a list 93 in one of the name storage locations 88) are all predetermined at startup by the navigation application and stored in the map configuration object 54. When no name positions are left in an item 95, a least squared routine is invoked to determine whether the existing positions stored in the item yield a more optimal placement for the name than the newly retrieved position. If the new position appears to be a better location, one of the existing positions is written over with the new position. Otherwise, the newly retrieved position is discarded.

A singly linked list 66 is used to store the information for point of interest icons. Point of interest information tends not to have multiple alternative positions for each icon and does not require the more sophisticated hashing function of the roadway names and roadway shield names. If the navigation application also displays the point of interest names, the point of interest name information 82 is buffered in the linked list 66 as well.

Once all the names and icons have been retrieved, the entire name table and point of interest list are processed together based on name placement priorities in the priority list 76 of the map object 52. The point of interest list may be presorted, before being processed for priority and conflicts with the name table as described herein, according to point of interest priority information contained in the point of interest data retrieved from the map database.

When performing the priority and conflicts checks on both the name table and point of interest list, the navigation application may supply a priority list or use the default priority list of the map display tool. In one embodiment, the priority list 76 contains a list of feature types (names of roadways of a certain rank, airports, rivers, parks, and etc.) The map processing layer processes the name and icon information in the order designated by the priority list. Thus, the map processing layer scans through all the buffered name placement information, in the order in which it exists in the name table and point of interest list, for the first type of name (e.g., road names of rank 4 roads) in the priority list, scans all the buffered information for the second type of name in the priority list (e.g., river names), and so on.

As prioritization takes place, the map processing layer performs a conflicts check to determine whether names and icons will overlap or interfere with one another on the rendered map. One or more new lists are created in the map object to hold data pertaining to names and icons that have passed the priority and conflicts checks. The conflicts check preferably consists of taking each name item in an order of priority and determining if the name will overlap the area of a name already selected based on priority. One of the new lists created in the name placement routine is a list that stores the spatial extents of each item that has passed the conflict check regardless of whether it is a roadway name, roadway shield or point of interest icon. Preferably, this list is a singly linked list. Each name from the name table or point of interest list is selected based on the priority list and the map display tool attempts to place the selected name or icon extents in the list of spatial extents. As the name is placed in the extents list, the extents of the newest name are compared to all previous extents stored in the list. If the extents of the newest name would conflict with the area required by a name already in the list, the newest name is omitted from the list, and thus omitted from the map.

Figure 17:
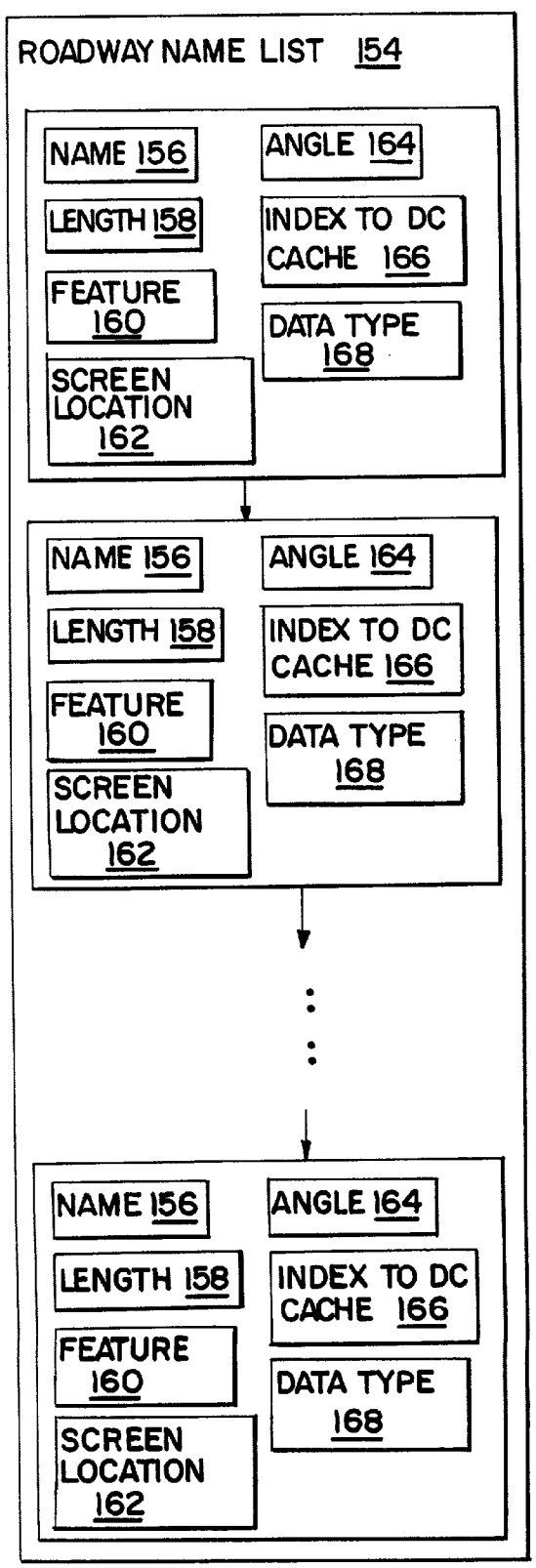
FIG. 17 is a diagram of a roadway list generated by the map processing layer of FIG. 8.

As indicated above, the name placement function in the map processing layer creates several lists in the map object to buffer items that have been successfully placed on the map. FIG. 17 illustrates the roadway name list 154 of roadway names that have passed conflicts. Each item in the list preferably contains the name 156, length of the name string 158, feature type 160, screen location 162, and angle 164 of the text. Each of the items in the buffered roadway name list 154 also may include information such as an index to the device context ("DC") cache 166 and the data type 168 information. The DC cache is a set of font types, styles and colors for use in generating the text of the names. Data type information 168 refers to the category of data contained in the map database 30. Preferably, three data types are maintained for roadways. The first roadway data type concerns all of the roadways for a given region for which the map database possesses a complete set of attributes such as speed limits, divided highway indications, direction of traffic, and so on. The second roadway data type concerns roadways for a given region that are suitable for display purposes but may be missing one or more attributes necessary for use with navigation system functions other than map display. The third roadway data type concerns major roadways that connect cities together. The map display tool may draw the name/shield information in a different way based on the type of data indicated.

Figure 18:
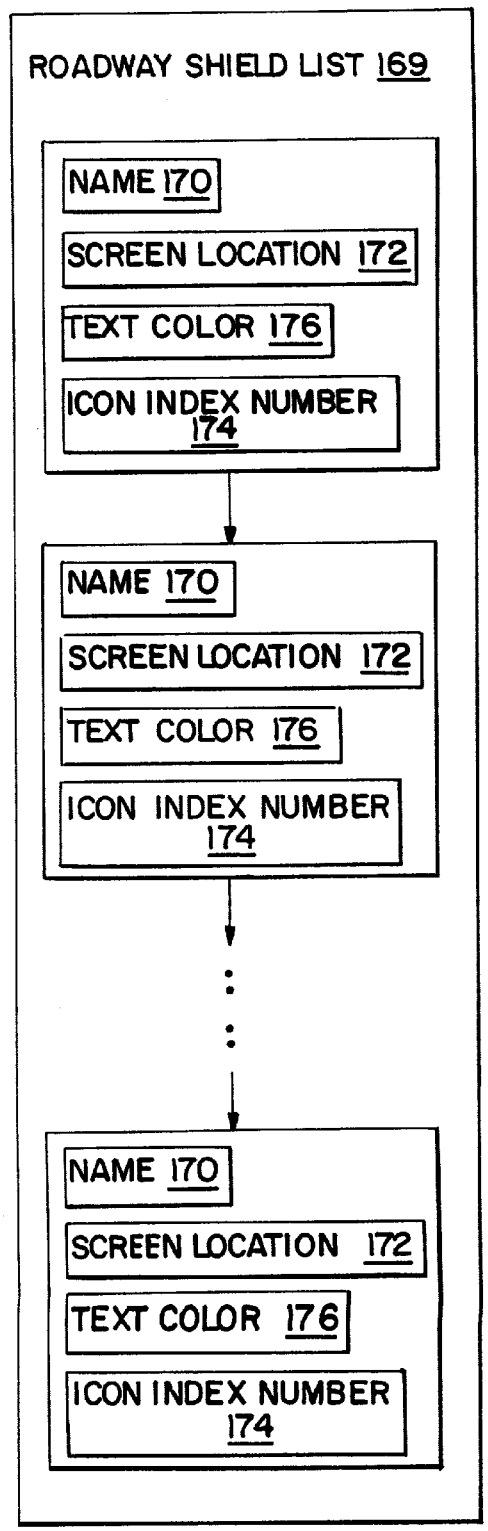
FIG. 18 is a diagram of a roadway shield list generated by the map processing layer of FIG. 8.

As shown in FIG. 18, the buffered list 169 of roadway shields that have passed conflicts include a list of information comprising the roadway name 170, screen location 172, a roadway shield icon index number 174, and the color of the text within the icon 176. There are a limited number of unique roadway shield shapes used in the world. Rather than store details on the specific shapes in the map database, the map database stores a roadway shield icon index number 174 identifying the type of roadway shield needed. A separate list of instructions for each shield type may be used to create the icon for the roadway shield type indicated.

With respect to point of interest items that have passed the conflicts checks, these are left in the prioritized singly linked list and flagged as having passed conflicts. As set forth above, the conflicts check is preferably performed by comparing the spatial extents of the icon or information against all the items already placed in the temporary spatial extents list described above. If the extents of the new item do not overlap any of the existing items in the list, it is then placed on the map and the extents are added to the spatial extents list. Additionally, the item is added to the appropriate list of successful items or flagged if it is a point of interest item.

Advantages of the name placement functionality described above include selection, prioritization and density control. Name selection is enhanced through the comparison of the buffered name table and point of interest list against the navigation application supplied priority list. If the feature type, for instance a point of interest name category, does not show up in any of the priority items of the priority list, then the name information for that feature will never get processed. Additionally, the name priority list will dictate the order in which the name information is processed and enforce name placement priorities. The name storage locations in the hash table are preferably assigned a fixed number of alternative positions for any unique name to control the density. Use of a least squared heuristic, or recycling available alternative positions, assists in optimally placing names. The present name placement functionality also supports processing name information on rotated maps. Because name location information is processed in the same manner as other shape information for map features (i.e., it is put through the same sequence of projection and transformation steps), the name placement logic is transparent to the fact that the map may be rotated.

C. Smooth Scrolling Functionality

Figure 19:
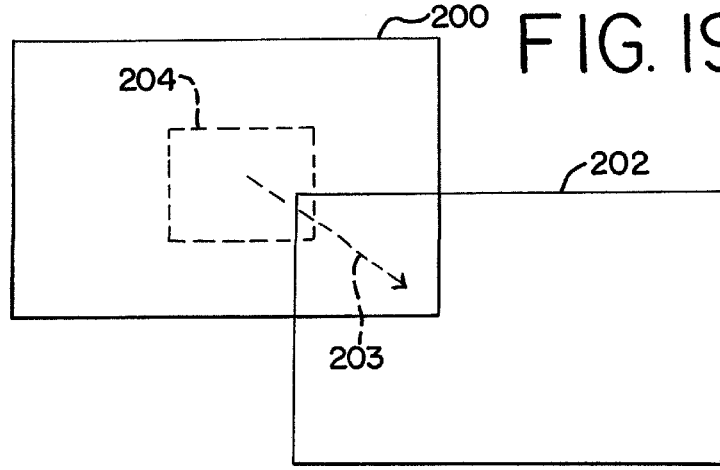
FIG. 19 is an illustration of map data coverage in a first graphics buffer and a second graphics buffer according to one embodiment of the presently preferred invention.

In one preferred embodiment, the map display tool possesses a smooth scrolling capability for moving items displayed on the screen rectangle smoothly across the display. Referring to FIG. 19, the implementation of the smooth scrolling function can be visualized as overlapping map areas 200, 202 where the first map area 200 represents map data rendered in the first graphics buffer 67, and the second map area 202 represents map data rendered, or being rendered, in the second graphics buffer 68. The first map area 200 consists of a present geographic location shown in the screen rectangle 204 and the surrounding area. The second map area 202 consists of a predicted future area to be rendered. Although preferably the same size, the graphics buffers 67, 68 may be of different sizes. In one embodiment, the graphics buffers 67, 68 are sized to hold at least 25% more rendered map data than can be displayed in the map rectangle 204.

As the navigation application provides instructions to scroll, the map rectangle 204 shown on the display moves within the first map area 200. The smooth scrolling function tracks the movement of the map rectangle, predicts where the map rectangle will intersect the boundaries of the first map area 200, and generates a second map area 202 based on the expected intersection point of the map rectangle with the boundary of the first map area. The second map area preferably includes some redundant information so that there is at least an overlap of map areas that includes the area in the first graphics buffer displayed when the map rectangle reaches the boundary.

In one embodiment, as shown in FIG. 19, the map rectangle forms the corner of the second map area if the direction of travel 203 of the map rectangle 202 is not perpendicular to the boundary of the first map area. If the direction of travel 203 is perpendicular to the boundary of the first map area, the second map area in the second buffer will overlap the entire edge of the first map area. Thus, the amount of overlap is equal to the height or width of the map rectangle depending on whether the map rectangle is moving vertically or horizontally when it intersects the boundary. When smooth scrolling is desired, the navigation application provides a smooth scrolling behavior flag to the map object 52. The behavior flag indicates that, after map data for the first graphics buffer 67 is obtained as described above, a look-ahead process should begin rendering a map in the second graphics buffer 68 for a predicted future position.

In order for the map display tool to render a map in a graphics buffer while updating the display from a rendered map in another graphics buffer, it requires the ability to use multiple threads or processes in the underlying platform 48 (i.e., multi-tasking). Because the map processing layer is designed as substantially platform independent and because the requirements for running multiple threads or processes are highly platform specific, the map display tool implements the multi-tasking abstraction layer 55, as described above, to support this smooth scrolling function regardless of platform.

Figure 20:
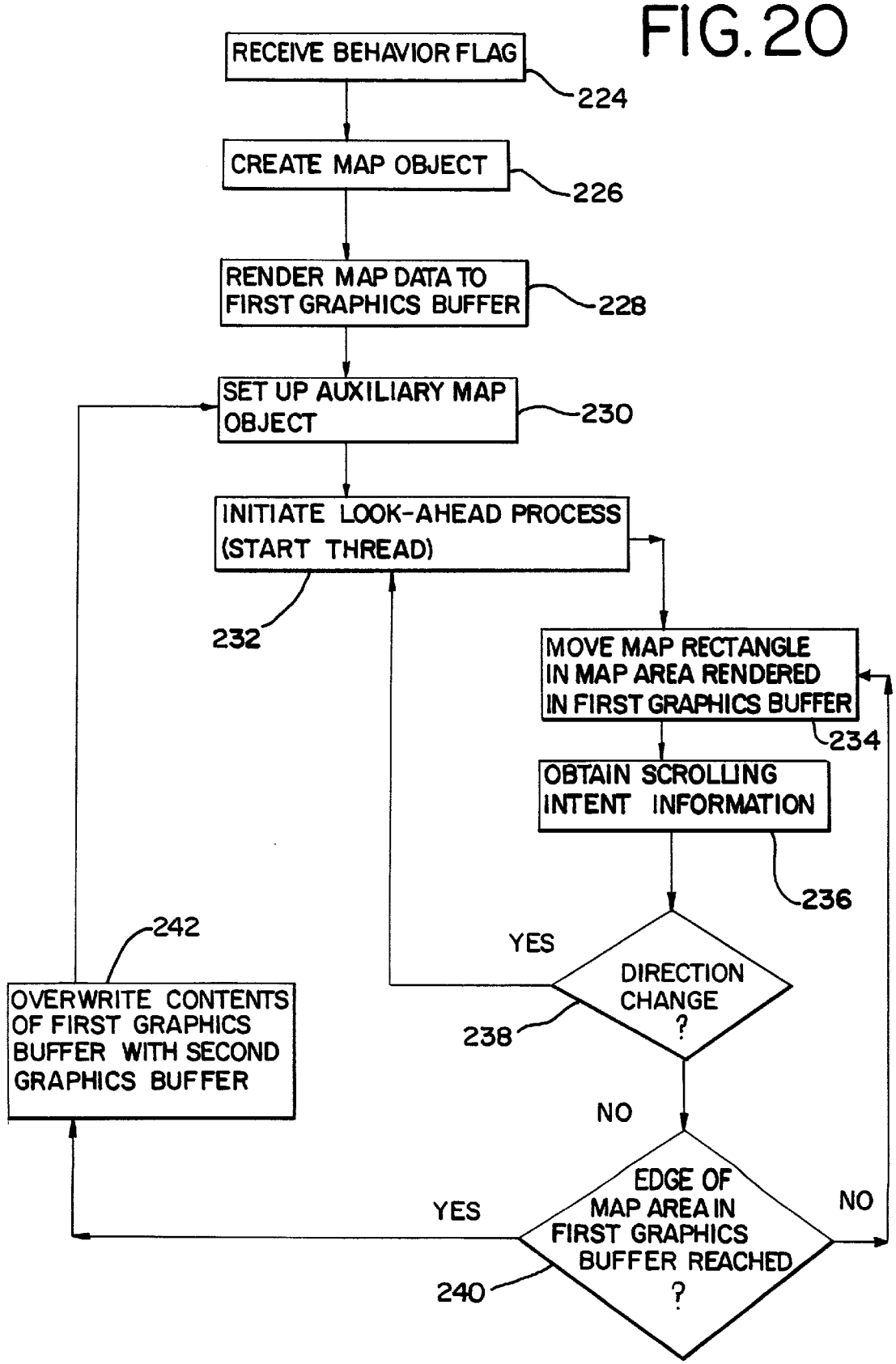
FIG. 20 is a flow diagram illustrating an embodiment of a smooth scrolling function implemented using the navigation system of FIG. 6.

FIG. 20 illustrates one method of implementing the smooth scrolling feature described above. The navigation application sends a behavior flag indicating the desire for smooth scrolling (at step 224). If the navigation system has just been powered up, a map object is created (at step 226). The map processing layer then retrieves map data and renders a map in the first graphics buffer (at step 228). After completely rendering the map in the first graphics buffer, the map display tool sets up an auxiliary object within the existing map object (at step 230). The auxiliary object is preferably a pseudo-object that uses the second graphics buffer in the map object and reuses and writes over the other resources (name table, etc.) in the map object when the look-ahead process runs in the background and renders a map in the second graphics buffer. Also, the auxiliary object retains many of the settings from the map object (such as the behavior flags) with the exception of the boundary information regarding the map area to be retrieved from the map database.

Before starting the look-ahead process, the map display tool first verifies that any prior map processing steps have ceased. The map display tool invokes the wait thread routine 214 and waits until the synchronization object 210 is free. Once any previous background thread is terminated, a new look-ahead process is started. The map display tool begins the look-ahead process by invoking the start thread callback function (at step 232). This function starts the map render process in the second graphics buffer for the predicted future position. The map render process is performed in the same manner as described above. As the look-ahead process progresses, the auxiliary map object is generated by writing over the memory locations of the map object containing information from map data retrieved and rendered to the first graphics buffer with the newly retrieved map data for the predicted future location.

Concurrently with the rendering of the map in the second graphics buffer, the map display tool moves the screen rectangle within the map area rendered in the first buffer and updates the display (at step 234). Movement of the map rectangle is based on a scroll direction and scroll speed supplied by the navigation application. Each incremental movement of the map rectangle appears on the display as steps of one or more pixels. After each incremental movement, the scroll function is invoked to determine the scrolling intent (at step 236). The scrolling intent refers to changes in speed or direction. If only the speed changes, the speed change is incorporated into the map rectangle movement and the number of pixels per movement is adjusted accordingly.

If the speed changes to zero then additional map information rendered to the graphics buffer but not displayed may be shown. In one embodiment, the scrolling functionality in the map display tool may include the option to display only a portion of the map data rendered in the first graphics buffers. For example, roads of rank 0 (e.g., alleys) may be omitted while the map scrolls and rendered when movement stops. In addition to avoiding a dense clutter of information on the display, processing time and efficiency may be increased. This feature of only drawing a selective rank of roadway to the display while scrolling and drawing more details every time the scrolling stops may be applied to any of the information rendered to the graphics buffers. This feature may be initiated through a function call originating in the navigation application or may be a default setting in the scrolling functionality in the map display tool.

If the direction changes (at step 238) then the auxiliary map object is recreated based on a new predicted future position and the look-ahead process begins again(at steps 230–232). If the direction does not change, the map display tool checks to see if the map rectangle has reached the edge of the map information in the first graphics buffer (at step 240). If the edge has not been reached, the map rectangle is moved again and the process repeats (at steps 234–240). The map rendering process in the second graphics buffer proceeds as illustrated in FIGS. 15–16.

Once the map rectangle reaches the edge of the first graphics buffer, the map display tool checks to see if the look-ahead process rendering the map in the second graphics buffer has finished by invoking the wait thread function. When the map display tool determines that the look-ahead process is done, the contents of the second graphics buffer will be copied into the first (at step 242). The scrolling process then continues as before with a look-ahead process starting again in a background thread utilizing the multi-tasking functionality retrieved by the multi-tasking abstraction layer. Thus, the map area shown on the display is always retrieved from the first buffer and the look-ahead function always renders a map of a predicted future position to the second buffer. One advantage of the smooth scrolling feature described above is its adaptability to various platforms. Another advantage is the ability to provide a user with greater map accuracy and performance by avoiding the overlap problem often associated with scrolling routines that simply update a strip of a map so that previously rendered data and newly rendered data appear on the display at the same time. The strip approach may lead to visible discontinuities where roads and other features are supposed to transition smoothly. Also, name placement difficulties arise where the geographic region displayed is generated using a piece-meal approach so that the display shows the result of multiple strip updates.

It is intended that the foregoing detailed description be regarded as illustrative rather than limiting and that it is understood that the following claims including all equivalents are intended to define the scope of the invention.

We claim:

1. A map display program for use in a navigation system having a graphics platform and a map database, the map display program adapted to retrieve and render map data from the map database to a display in response to instructions from a navigation application, the map display program comprising:

a map processing layer comprising a scrolling function for providing movement of rendered map data across the display, the map processing layer responsive to the navigation application and in communication with a graphics interface layer, the map processing layer having a multi-tasking abstraction layer defining multi-tasking function requirements;

the graphics interface layer having at least one lookup table, the at least one lookup table comprising drawing attribute information, the graphics interface layer responsive to instructions from the map processing layer; and a primitive layer in communication with the graphics interface layer and the graphics platform, the primitive layer populating the at least one lookup table in the graphics interface layer with platform specific data types from the graphics platform, wherein the map processing layer is independent of the graphics platform.

2. The map display program of claim 1, wherein the multi-tasking abstraction layer comprises a start thread function requirement, the start thread function requirement containing instructions to retrieve a synchronization object and begin rendering map information to a graphics buffer in a background process.

3. The map display program of claim 2, wherein the multi-tasking abstraction layer comprises an end thread function requirement, the end thread function requirement containing instructions to terminate the background process and retrieve the synchronization object.

4. The map display program of claim 1, wherein the multi-tasking abstraction layer comprises a scroll function requirement, the scroll function requirement containing instructions to retrieve a scroll speed indicator from the navigation application.

5. A map display program for use in a navigation system used with a map database, the map display program adapted to retrieve and display geographical information representative of an area in response to requests from a navigation application in the navigation system, the map display program comprising:

a map object comprising:

a first graphics buffer for holding map data related to a present position; and a second graphics buffer for holding map data related to a predicted future position, the predicted future position comprising a portion of the map data in the first graphics buffer and map data representative of a geographic area contiguous with, and extending from, a geographic area rendered from the portion of map data in the first graphics buffer and;

a map rectangle defining a portion of the map data in the first graphics buffer presented on a display, wherein each of the first and second graphics buffers comprises a map data storage area configured to hold at least 25% more map data than an amount of map data used to display a geographic area in the map rectangle.

6. The map display program of claim 5, wherein the first graphics buffer has a same size as the second graphics buffer.

7. A map display program for use in a navigation system used with a map database, the map display program adapted to retrieve and display geographical information representative of an area in response to requests from a navigation application in the navigation system, the map display program comprising:

a map object comprising:

a first graphics buffer for holding map data related to a present position;

a second graphics buffer for holding map data related to a predicted future position, the predicted future position comprising a portion of the map data in the first graphics buffer and map data representative of a geographic area contiguous with, and extending from, a geographic area rendered from the portion of map data in the first graphics buffer;

a name table having a plurality of name storage locations for holding a plurality of roadway names retrieved from the map database, each name storage location containing a first list of roadway names; and at least one name placement position associated with each of the roadway names, wherein the name placement position represents a position on a display.

8. The map display program of claim 7, wherein the map object further comprises:

a name prioritization routine adapted to select roadway name information from the name table according to a predetermined priority list; and at least one prioritized information list located in the map object, the prioritized information list generated by the name prioritization routine and containing data associated with names selected by the name prioritization routine.

9. The map display program of claim 7, further comprising a point of interest list, the point of interest list containing data from the map database pertaining to at least one point of interest name and location data for the point of interest name.

10. The map display program of claim 7, wherein the plurality of name storage locations contain a plurality of roadway shield icons.

11. The map display program of claim 7, wherein the prioritized information list further comprises located in the map object, the prioritized information list generated by the name prioritization routine and containing data associated with names and icons selected by the name prioritization routine.

12. The map display program of claim 7 further comprising:

a point of interest list containing data from the map database pertaining to at least one point of interest name and location data for the point of interest name; and a list of roadway shield icons in the plurality of name table locations in the name table, wherein the name prioritization routine is adapted to select roadway name information and roadway shield icon information from the name table according to the priority list, and wherein the name prioritization routine is adapted to select point of interest names according to the priority list.

13. The map display program of claim 7 further comprising a map rectangle defining a portion of the map data in the first graphics buffer presented on a display.

14. The map display program of claim 7 wherein the first graphics buffer has a same size as the second graphics buffer.

15. A map display program for use in a navigation system used with a map database, the map display program adapted to retrieve and display geographical information representative of an area in response to requests from a navigation application in the navigation system, the map display program comprising:
- a map object comprising:
  - a first graphics buffer for holding map data related to a present position; and
  - a second graphics buffer for holding map data related to a predicted future position, the predicted future position comprising a portion of the map data in the first graphics buffer and map data representative of a geographic area contiguous with, and extending from, a geographic area rendered from the portion of map data in the first graphics buffer;
- a point of interest list, the point of interest list containing data from the map database pertaining to at least one point of interest name and location data for the point of interest name; and
- a list of roadway shield icons in the plurality of name table locations in the name table, wherein the name prioritization routine is adapted to select roadway name information and roadway shield icon information from the name table according to the priority list, and wherein the name prioritization routine is adapted to select point of interest names according to the priority list.

16. The map display program of claim 15 further comprising a map rectangle defining a portion of the map data in the first graphics buffer presented on a display.

17. The map display program of claim 15 wherein the first graphics buffer has a same size as the second graphics buffer.

18. The map display program of claim 15 wherein the map object further comprises:
- a name table having a plurality of name storage locations for holding a plurality of roadway names retrieved from the map database, each name storage location containing a first list of roadway names; and
- at least one name placement position associated with each of the roadway names, wherein the name placement position represents a position on a display.

19. The map display program of claim 18 wherein the map object further comprises:
- a name prioritization routine adapted to select roadway name information from the name table according to a predetermined priority list; and
- at least one prioritized information list located in the map object, the prioritized information list generated by the name prioritization routine and containing data associated with names selected by the name prioritization routine.

20. The map display program of claim 18 further comprising a point of interest list containing data from the map database pertaining to at least one point of interest name and location data for the point of interest name.

21. A method of preparing name information for placement on a map display of a navigation system, the method comprising the steps of:
- retrieving map data for a first predetermined geographical area from a map database stored on a computer readable medium, the map data comprising name information;
- generating a name table in a map object, the name table comprising all name information for the retrieved map data;
- selecting name information from the name table using a predetermined set of name priority rules stored in the map object;
- generating at least one list in the map object containing the selected name information in the map object;
- rendering the selected name information to a first graphics buffer;
- retrieving map data for a second predetermined geographical area from a map database stored on a computer readable medium, the map data comprising name information;
- regenerating the name table in the map object, the name table comprising all name information for retrieved map data for the second predetermined location;
- selecting name information from the regenerated name table using the predetermined set of name priority rules stored in the map object;
- regenerating at least one list in the map object containing the selected name information in the map object; and
- rendering the selected name information to a second graphics buffer in the map object.

* * * * *